(12) United States Patent
Fujishima

(10) Patent No.: US 8,282,483 B2
(45) Date of Patent: Oct. 9, 2012

(54) GAME SYSTEM AND COMPUTER PROGRAM

(75) Inventor: Takenobu Fujishima, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 162 days.

(21) Appl. No.: 12/808,862

(22) PCT Filed: Dec. 24, 2008

(86) PCT No.: PCT/JP2008/073378
§ 371 (c)(1),
(2), (4) Date: Jun. 17, 2010

(87) PCT Pub. No.: WO2009/081921
PCT Pub. Date: Jul. 2, 2009

(65) Prior Publication Data
US 2010/0267453 A1   Oct. 21, 2010

(30) Foreign Application Priority Data
Dec. 25, 2007   (JP) .................................. 2007-331897

(51) Int. Cl.
*A63F 13/00* (2006.01)

(52) U.S. Cl. .................. 463/35; 463/1; 463/40; 463/43; 345/473; 273/148 B

(58) Field of Classification Search ................. 463/1, 35, 463/43, 40; 345/473; 273/148 B
See application file for complete search history.

(56) References Cited

U.S. PATENT DOCUMENTS

| | | | |
|---|---|---|---|
| 5,919,047 A | 7/1999 | Sone ........................ 434/307 A |
| 6,607,446 B1 | 8/2003 | Shimomura et al. ............ 463/43 |
| 6,769,689 B1 | 8/2004 | Shimomura et al. ...... 273/148 B |
| 2001/0012795 A1 | 8/2001 | Asami et al. ...................... 463/1 |
| 2004/0231498 A1* | 11/2004 | Li et al. ............................ 84/634 |
| 2008/0212437 A1* | 9/2008 | Kataoka et al. ............ 369/53.41 |
| 2009/0324192 A1* | 12/2009 | Ogura et al. ..................... 386/66 |
| 2010/0131080 A1* | 5/2010 | Brown et al. ................... 700/17 |
| 2010/0323800 A1* | 12/2010 | Inubushi ........................ 463/43 |
| 2011/0020782 A1* | 1/2011 | Ko ................................. 434/362 |

FOREIGN PATENT DOCUMENTS

| | | |
|---|---|---|
| EP | 0 791 914 A1 | 8/1997 |
| EP | 1 029 570 A2 | 8/2000 |
| EP | 1 031 904 A2 | 8/2000 |

(Continued)

OTHER PUBLICATIONS

International Search Report of PCT/JP2008/073378 dated Feb. 10, 2009.

(Continued)

*Primary Examiner* — Pierre Eddy Elisca
*Assistant Examiner* — Shahid Kamal
(74) *Attorney, Agent, or Firm* — Sughrue Mion, PLLC

(57) ABSTRACT

Processor (27) reads, from DVD-ROM (231), musical sound data and step data for plural specified periods indicated by plural pieces of section dance data indicated by medley dance data, for storage into RAM (25), and exclusively uses these pieces of data, for each specified period, in the order indicated by the medley dance data, to progress the play of a specific game. Additionally, in the game system (1), the player of the specific game operates a general operation unit (22) to freely create a section dance and a medley dance.

14 Claims, 14 Drawing Sheets

FOREIGN PATENT DOCUMENTS

| | | |
|---|---|---|
| EP | 1 033 157 A2 | 9/2000 |
| JP | 9-230880 A | 9/1997 |
| JP | 2000-245957 A | 9/2000 |
| JP | 3261110 B | 10/2000 |
| JP | 3869175 B | 8/2001 |

OTHER PUBLICATIONS

Taiwanese Office Action and Search Report corresponding to Taiwanese Patent Application No. 097150697, dated Jan. 10, 2012, English language translation.

* cited by examiner

GAME SYSTEM AND COMPUTER PROGRAM

CROSS-REFERENCE TO PRIOR APPLICATIONS

This application is a filing under 35 U.S.C. §371 of International Application No. PCT/JP2008/073378, filed on Dec. 24, 2008, which claims priority to Japanese Application No. 2007-331897, filed Dec. 25, 2007, the disclosure of each of which is incorporated herein by express reference thereto.

TECHNICAL FIELD

The present invention relates to a game system for a computer game and to a computer program therefor.

BACKGROUND ART

There is, as a type of computer game, a music game in which a song is replayed during the play, an image for instructing a movement is displayed, and a result of the play is determined based on the degree of agreement of the player's movement with the instructed movement. There is, as a type of music game, a dance game in which instructed movements are dance movements. Japanese Patent Publication No. 3261110 discloses a game system for a dance game. In this game system, the player of a dance game is allowed to edit dance (steps) to be instructed.

Furthermore, Japanese Patent Publication No. 3869175 discloses a game system for a dance game in which, in those periods of a song that are not suitable as a game music such as a beginning portion and an end portion thereof, special bridge music suitable for maintaining a player's tense feeling is output so that the player can continue playing plural songs while maintaining the tense feeling. In this game system, the musical sound of a song fades out at the end portion of the song, and the musical sound of bridge music is output, the bridge music overlaying the song; and in the beginning portion of a subsequent song, the musical sound of the subsequent song fades in, overlaying the musical sound of the bridge music.

In the game system described in Japanese Patent Publication No. 3261110, the music is replayed for each song. That is, it is not assumed that a medley in which freely-selected portions of freely-selected songs are connected for plural songs is replayed in a music game. Although a medley can be replayed in this game system if musical sound data for a medley (musical sound data in which pieces of musical sound data for portions of songs are connected for plural songs) is prepared, only medleys that are prepared in advance can be played in this case.

In the game system described in Japanese Patent Publication No. 3869175, it is possible to replay a medley in which plural songs are connected. However, the medley replayed in this game system is a medley in which plural songs randomly selected by a processor are connected and is not a medley in which freely selected portions of freely selected songs are connected for plural songs. Thus, in this game system, a freely created medley cannot be replayed. Moreover, this game system requires bridge music between songs.

DISCLOSURE OF INVENTION

The present invention has been made in consideration of the above and has as objects to provide a game system for a music game in which a freely created medley can be replayed without requiring bridge music, and to provide a computer program therefor.

Explanation will first be given of terms.

A "game" is an activity involving some rules for determining a result of a play (game play) such as music games and puzzles. A "play" of a game is a single act of a player performing a game. Therefore, in a single game, plural plays can be repeated by the same player, and plural plays can be performed simultaneously by plural players. A person who can perform a play is called a "player" of the play or game. Therefore, even if a person has not played a game in the past or is not currently playing a game, the person who may potentially play a game is sometimes called a player. However, a player who is actually playing a game and has played a game, in particular, is called a "participant player (participating player)" of the play. In each play, a "result" of the play is an evaluation which a participant player of the play wishes to obtain. Examples of results of a play include win or loss, a rank, and a score.

A "computer game" is a game for which a play is carried out by a computer. A computer used for carrying out a computer game is called a "game terminal". Among game terminals is a "game terminal" which has a user interface for operation by a player of the computer game. A system that has a game terminal is called a "game system" for the computer game.

A "computer" or a "computer system" is, from among apparatuses for processing data, one that has a memory for storing data and a processor for executing a computer program or a computer program element that is a part or the whole of the computer program stored in the memory. "Data" represents information in a form that is recognizable by a machine such as a computer. Examples of data include data electrically representing information, data magnetically representing information, and data optically representing information. "Information" is an object of a process that can be represented by data. The "memory" is a device that readably stores data written therein. Examples of the memory include a semiconductor memory, a magnetic memory, and an optical memory. A "computer program" or "computer program element" is, from among collections of data representing instructions, one that indicates the procedure of a process. Examples of a computer program or a computer program element include a program for causing a computer to carry out a procedure of a computer game when the program is run by the computer. A "processor" is a device that executes a computer program by performing a process of executing instructions represented by data in the computer program in accordance with a procedure indicated by the computer program, the computer program being a collection of data representing instructions. Examples of a processor include a single CPU (Central Processing Unit) and a collection of plural CPUs.

Examples of a computer or a computer system include a computer provided with an interface with the outside. Examples of an interface with the outside include: an input interface for receiving information or data from the outside and an output unit for outputting information or data to the outside. Examples of the input interface include a sensor, a button, and a keyboard. "To output" information is to represent information represented by data in such a way that information can be perceived by a human. Examples of ways in which information can be perceived by a human include by light, by sound, and by vibration. Examples of outputting information by light include the displaying of images and the blinking of lights. Examples of outputting information by sound include emitting sounds by a speaker and driving a sound structure by a solenoid (for example, ringing a bell). Examples of outputting information by vibration include oscillation by an oscillator.

Description will next be given of the present invention.

The present invention provides a game system for a music game in which, in a play of the game, musical sounds are replayed, in which an image for instructing a movement is displayed, and in which a result of the play is determined based on the degree of agreement of a movement of the player with the movement instructed by the image, the game system having: an operator that is operated by the player; an individual data storage having stored thereon, for each of plural songs, musical sound data indicating musical sounds of each song in a full length and pieces of movement data indicating the movements to be instructed by the image for the song in a full-length; a section data storage that stores, for each of at least two of the plural songs, section data indicating a specified period of the full-length song, the specified period having been specified by using the operator; a medley data storage that stores medley data indicating, from among plural pieces of the section data stored in the section data storage, at least two pieces of section data specified by using the operator and also indicating the order of the at least two pieces of section data, with the order having been specified by using the operator; a temporary storage that temporarily stores the musical sound data and the movement data; a loader that performs a load process of reading, from the individual data storage, the musical sound data and pieces of the movement data corresponding to each of the at least two specified periods indicated by the at least two pieces of section data indicated by the medley data, for storage in the temporary storage; and a progressor that performs a progressing process for progressing the play by exclusively using the musical sound data and the pieces of movement data stored in the temporary storage for each specified period and in the order indicated by the medley data, thereby connecting the musical sounds of the at least two specified periods, for replay, in which game system the loader performs the load process of loading the musical sound data by reading the musical sound data of at least two extension periods for each of the at least two specified periods, with each extension period including the specified period; and in which game system, the progressor performs the progressing process by progressing the play by using the musical sound data and the pieces of movement data stored in the temporary storage for each specified period, in the order indicated by the medley data and in such a way that a connection period of a certain length is provided between the specified periods, and the progressor performs, in the connection period, an extension process of causing the musical sounds of the extension period including an earlier one of the two specified periods sandwiching the connection period to fade out and the musical sounds of the extension period including a later one of the specified periods to fade in.

According to this game system, in a play of a music game, any medley specified by a player can be replayed without requiring bridge music between songs. Furthermore, according to this game system, the amount of data can be reduced, compared with a case in which musical sound data for a medley is additionally separately prepared. Furthermore, in replaying a medley, because the musical sounds are cross-faded between two specified periods having the relationship of the immediately previous to and the immediately after a connection period, an impression of oddness given to a player can be reduced.

In the above game system, the temporary storage may store a piece of movement data for a connection period, the movement data indicating a movement instructed by the image during the connection period; and the progressor may use the movement data for the connection period in the connection period. As a result, during a connection period, an image for instructing a movement can be displayed, and a player can receive instructions for movements also in the connection period. Preferably, the movement data corresponding to the specified period may also serve as the movement data for the connection period, and the game system may additionally have a movement changer that changes, from among pieces of movement data stored in the temporary storage, a piece of movement data that is included in the earlier specified period and that represents a last duration of the specified period so that the piece of movement data represents a duration that ends at the finish time of the connection period. In this case, movement data is processed so that an image for instructing a movement is displayed also in a connection period. Therefore, when compared with a case in which this processing is not performed, a player can make a smooth transition to a next specified period because the player does not have to stop the movements suddenly when it enters a connection period. Moreover, an impression of oddness given to a player can be reduced to a greater extent.

Furthermore, preferably, the loader may perform the load process of loading the movement data by reading pieces of the movement data of at least two extension periods each including the respective of the at least two specified periods, and the progressor may generate the movement data for the connection period based on, from among the pieces of the movement data for two extension periods, a piece of the movement data with respect to the connection period, each of the two extension periods including respective two specified periods sandwiching the connection period, and the progressor may use the movement data for the connection period in the connection period. According to this embodiment, during a cross-fading period, an image for instructing a movement suited for a song can be displayed.

Furthermore, in one of the above embodiments, the progressor, in the extension process, may additionally cause the musical sounds of an extension period including a first specified period that is the first in the order to fade in, in a lead end period that is immediately before the first specified period. In one of the above embodiments, the progressor, in the extension process, may additionally cause the musical sounds of an extension period including a last specified period that is the last in the order to fade out, in a tail end period that is immediately after the last specified period. According to these embodiments, an impression of oddness given to a player can be reduced to a greater extent.

In one of the above embodiments, the game system may additionally have plural channels for a sound generator, and the progressor may use two channels of the plural channels and switch, for each extension period, a channel for replaying the musical sounds based on the musical sound data between the two channels. In this embodiment, cross-fading can be realized even in a case in which the number of channels of the sound generator is two.

In one of the above embodiments, the loader may perform the load process by reading, from the individual data storage, sequentially for each specified period, pieces of the musical sound data of the at least two specified periods, and the progressor may start the progressing process after the pieces of the musical sound data for a predetermined number of specified periods are stored in the temporary storage. According to this embodiment, even in a case in which the access speed for an individual data storage device is relatively slow, the play is less likely to be cut off.

The present invention provides a computer program (or a computer program product), or a computer-readable recording medium having this computer program recorded thereon, the computer program being executed by a processor of a game system for a music game in which, in a play of the game, musical sounds are replayed, in which an image for instructing a movement is displayed, and in which a result of the play is determined based on the degree of agreement of a movement of the player with the movement instructed by the image, the game system having an operator that is operated by the player, an individual data storage having stored thereon, for each of plural songs, musical sound data indicating musical sounds of each song in full length and pieces of movement data each indicating the movements to be instructed by the image for the full-length song; a section data storage that stores, for each of at least two of the plural songs, section data indicating a specified period of the full-length song, the specified period having been specified by using the operator; a medley data storage that stores medley data indicating, from among plural pieces of the section data stored in the section data storage, the at least two pieces of section data specified by using the operator and also indicating the order of the at least two pieces of section data, with the order having been specified by using the operator; and a temporary storage that temporarily stores the musical sound data and the movement data, the computer program causing the processor to execute: a load process of reading, from the individual data storage, the musical sound data and pieces of movement data corresponding to each of the at least two specified periods indicated by the at least two pieces of section data indicated by the medley data, for storage in the temporary storage; and a progressing process of progressing the play by exclusively using the musical sound data and the pieces of movement data stored in the temporary storage for each specified period and in the order indicated by the medley data, thereby connecting the musical sounds of the at least two specified periods for replay, and in the load process, the processor causes the musical sound data to load, by reading the musical sound data of at least two extension periods for each of the at least two specified periods, with each extension period including the specified period; and in the progressing process, the processor causes the play to progress by using the musical sound data and the pieces of movement data stored in the temporary storage for each specified period, in the order indicated by the medley data and in such a way that a connection period of a certain length is provided between the specified periods, and, in the connection period, the processor causes the musical sounds to fade out, of the extension period including an earlier one of the two specified periods sandwiching the connection period, and causes the musical sounds to fade in, of the extension period including a later one of the specified periods.

According to this computer program, in a play of a music game, any medley specified by a player can be replayed without requiring bridge music between songs. Furthermore, according to this game system, data amount can be reduced, compared with a case in which musical sound data for medley is additionally separately prepared. Furthermore, in replaying a medley, because the musical sounds are cross-faded between two specified periods having the relationship of the immediately previous to and the immediately after a connection period, an impression of oddness given to a player can be reduced.

The present invention can be understood as a computer program product having a medium that retains data that becomes the computer program when loaded into a computer.

A computer program or a computer program element of the present invention can be executed on a computer or on a computer system, includes instructions (software code portions) for, when executed on a computer or on a computer system, causing the processor of the computer or the computer system to execute a process according to the present invention, and can make a general-purpose computer or a computer system to serve as a computer or a computer system according to the present invention. Such a computer program or a computer program element can be distributed, with data (i.e., a computer program) loadable into a memory of a computer or of a computer system being recorded on a recording medium such as a CD-ROM or a diskette. Also, the data carrier includes a recording medium having recorded thereon a computer program according to the present invention. Furthermore, the data carrier may be a data connection or transmission medium for transmitting a signal indicating a computer program according to the present invention, and includes an electrical communication line such as a telephone line, a wireless communication line, and the Internet.

According to the present invention, in a play of a music game, any medley can be replayed, without requiring bridge music between songs. Furthermore, according to the present invention, the data amount can be reduced in comparison with a case in which musical sound data for a medley is additionally separately prepared.

BEST MODE FOR CARRYING OUT THE INVENTION

In the following, description will be given of a preferred embodiment of the present invention with reference to the drawings. The specific configurations described below are merely examples, and the present invention encompasses various embodiments obtained by modifying the specific configurations within its scope.

1. Game System

Figure 1:
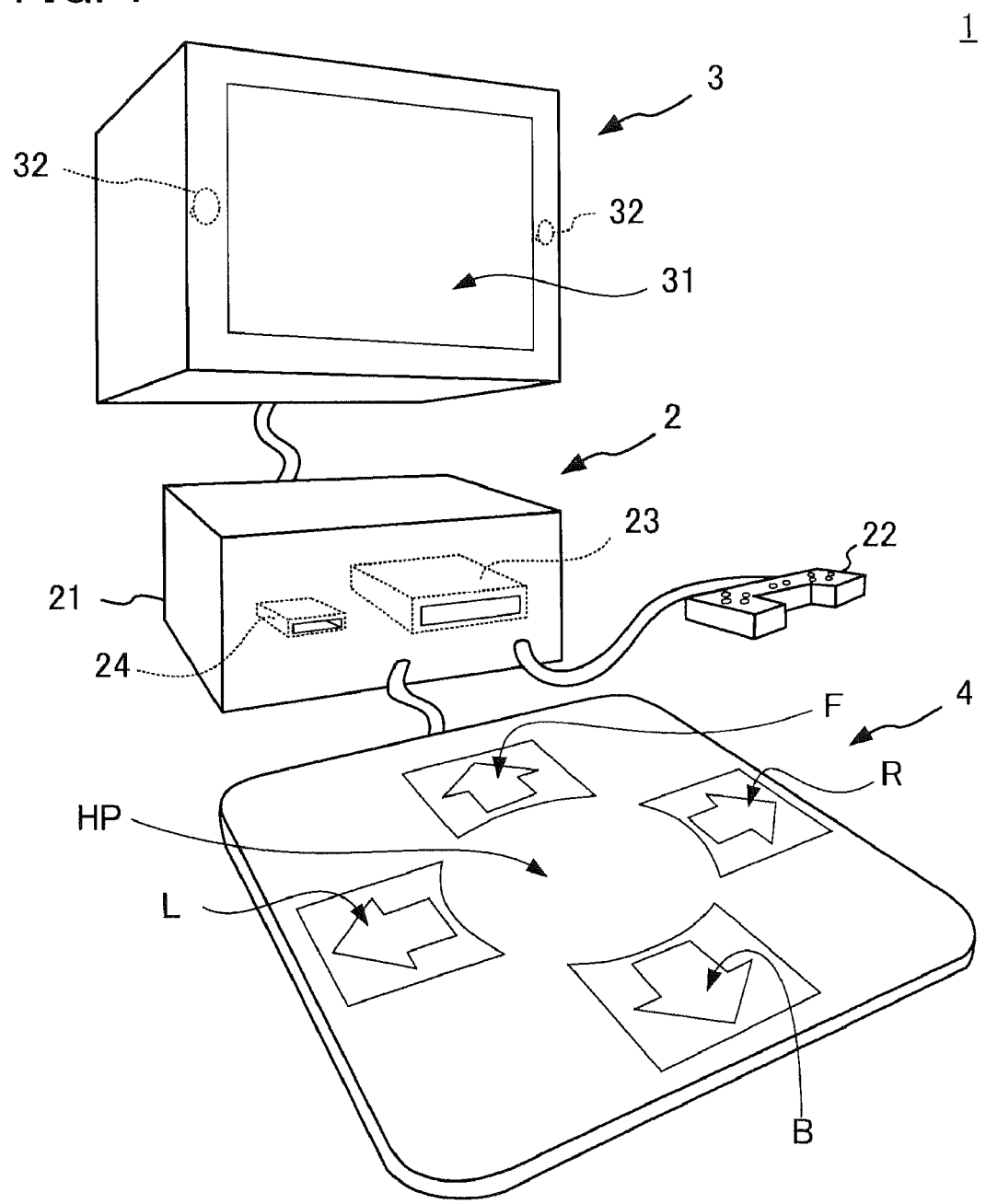
FIG. 1 is a block diagram showing the configuration of a game system according to an embodiment of the present invention.

FIG. 1 is a block diagram showing a configuration of a game system 1 according to an embodiment of the present invention. Only main components are shown in this figure. Game system 1 is a game system for a specific game. The specific game is a type of a computer game and is a dance game (music game) in which a result of a play is determined based on the degree of agreement of a player's moves (dance) with movements defined in the standard dance. The standard dance is a dance that can be used as a standard in calculating the degree of agreement. In the specific game, the musical sounds are replayed in a play, and an image for instructing the standard dance (an image for instructing a movement) is displayed. In the present embodiment, a player is allowed to select as a standard dance either an individual dance or a medley dance for play. The individual dance is a dance in which a player dances to the prearranged dance song that was prepared in advance, and a medley dance is a dance in which a player dances to a medley music which was generated based on the prearranged dance songs by instruction from the player.

Game system 1 is provided with a home-use game machine 2, a television 3, and a dedicated operation unit 4. Home-use game machine 2 is a game device for the specific game and is provided with a main unit 21 and a general operation unit (operation unit) 22. General operation unit 22, television 3, and dedicated operation unit 4 each are connected to main unit 21. General operation unit 22 is operated by a player of the specific game, is provided with plural operation buttons, and outputs operation data unique to a pressed button. Operation data output from general operation unit 22 is supplied to main unit 21.

Television 3 is provided with a screen 31 on which an image is displayed and plural speakers 32 for outputting sounds. When image data representing an image is supplied from main unit 21, the image represented by this image data is displayed on screen 31; and, when sound data representing sound is supplied from main unit 21, the sound represented by this sound data is output from speakers 32. That is, television 3 serves as an image outputter for receiving image data and outputting an image represented by this image data to the outside, and as a sound outputter for receiving sound data and outputting sound represented by this sound data.

Dedicated operation unit 4 is sheet-shaped, is placed on the floor, and is stepped on by a player of the specific game. The dedicated operation unit has a front step spot F that is stepped on when a player of the specific game moves a leg of the player forward from a home position HP, a back step spot B that is stepped on when the player moves the leg backward, a left step spot L that is stepped on when the player moves the leg leftward, and a right step spot R that is stepped on when the player moves the leg rightward, and outputs operation data unique to a step spot being stepped on. Operation data output from dedicated operation unit 4 is supplied to main unit 21.

Figure 2:
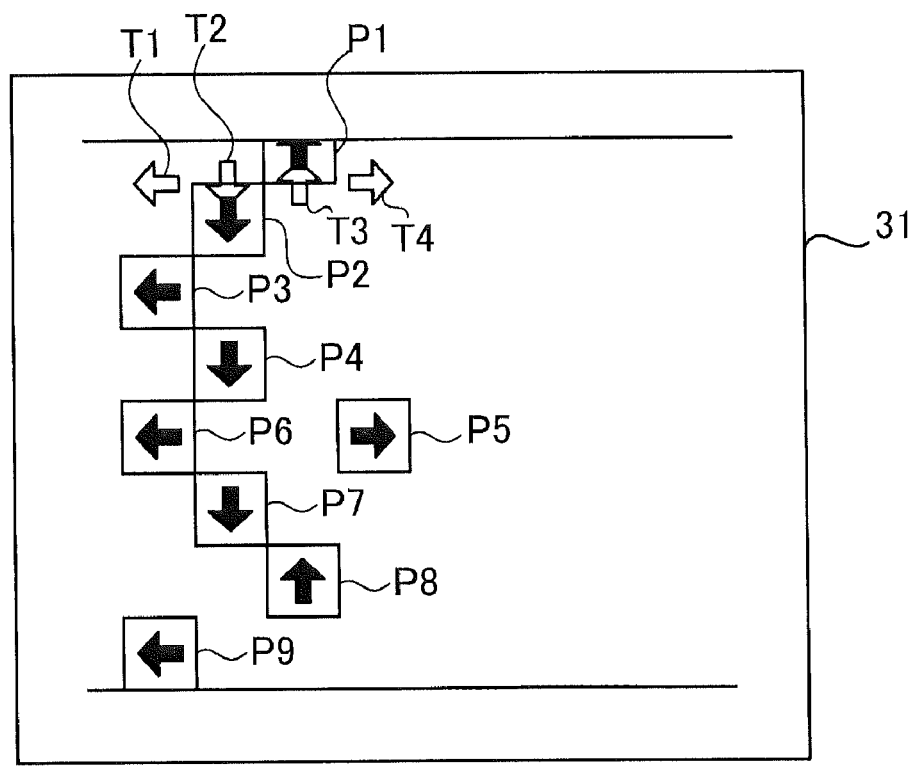
FIG. 2 is a diagram showing an example of an image displayed on a screen of the game system.
Figure 3:
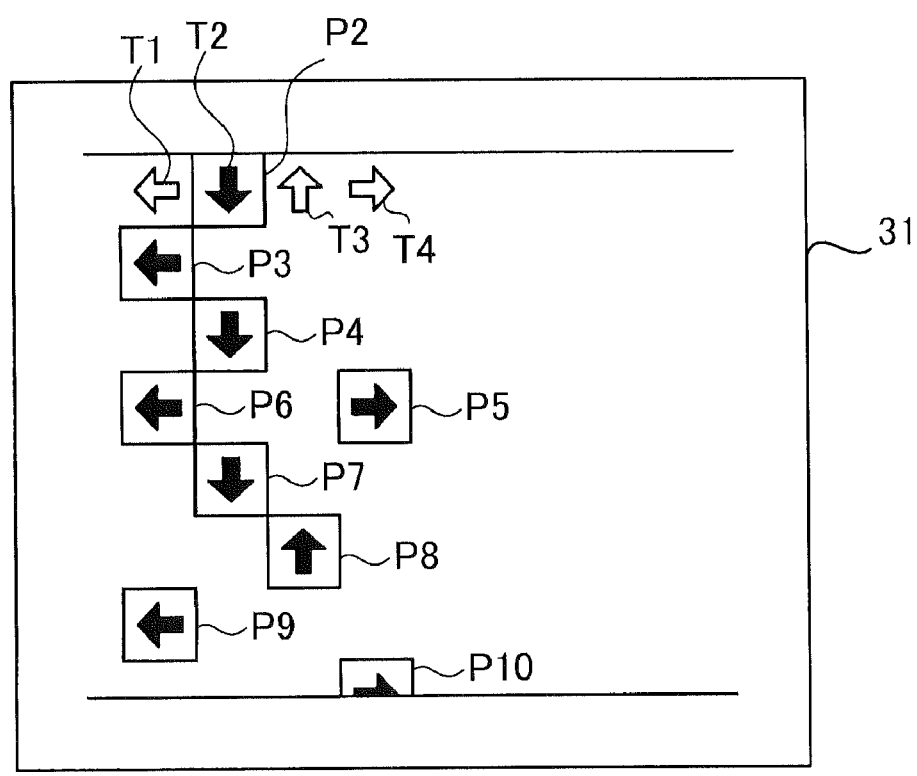
FIG. 3 is a diagram showing an example of an image displayed on the screen of the game system.

FIGS. 2 and 3 each are diagrams showing examples of images for instructing a standard dance, the images being displayed on screen 31. These images are images displayed on screen 31 in a play of the specific game, and an image of FIG. 2 is displayed on screen 31, and an image of FIG. 3 is displayed thereafter. As is obvious from these diagrams, in a play of the specific game, there are displayed on screen 31 step spot indication marks P1, P2, ... moving upwardly from the bottom of the screen and step duration indication marks T1 to T4 that are fixedly aligned in the top of the screen and in the horizontal direction of the screen.

Step duration indication marks T1, T2, T3, T4 indicate durations to step on left step spot L, back step spot B, front step spot F, and right step spot R. Step spot indication mark P1, P2, ... indicates, as a step spot to step on, one of front step spot F, back step spot B, left step spot L, and right step spot R. Each step spot indication mark, when it moves to the top of screen 31, overlaps a step duration indication mark during a period in which a step spot instructed by the step spot indication mark is to be stepped on. FIG. 3 shows a state in which step spot indication mark P2 and step duration indication mark T2 overlap with each other, and the period in which this state is shown is a timing to step on step spot indication mark P2.

In a play of the specific game, the player stands in front of dedicated operation unit 4, while looking at an image displayed on screen 31, and steps on a step spot instructed by the image at a timing instructed by the image, to dance. In this case, operation data representing this dance is output from dedicated operation unit 4. In other words, dedicated operation unit 4 serves as a dance detector for detecting a dance of the player.

2. Home-Use Game Machine

Figure 4:
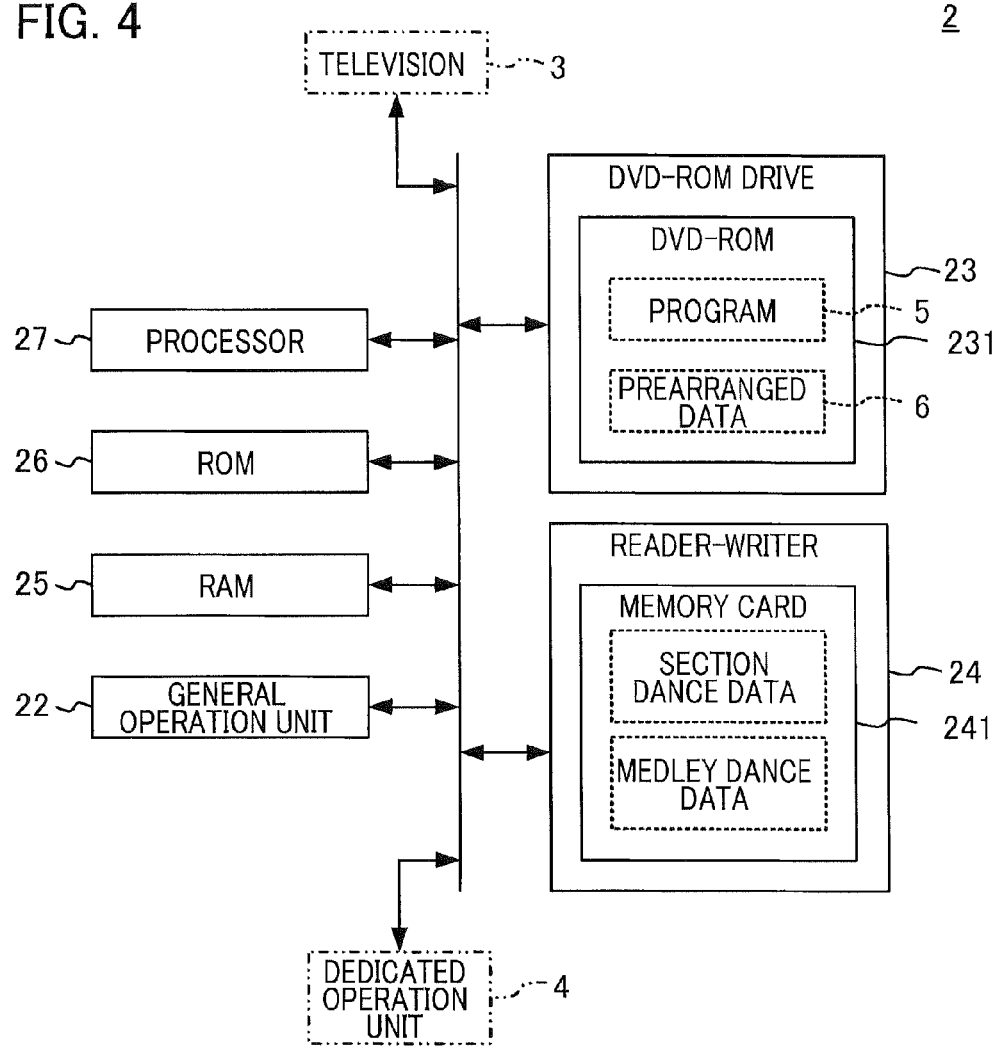
FIG. 4 is a block diagram showing an electrical configuration of a home-use game machine included in the game system.

FIG. 4 is a block diagram showing an electrical configuration of home-use game machine 2. Home-use game machine 2 is a computer, and internally provided with main unit 21 are a DVD-ROM (Read Only Memory) drive 23, a reader-writer 24, a RAM (Random Access Memory (a section data storage device, a medley data storage device, a temporary storage device)) 25, a ROM (Read Only Memory) 26, and a processor (progressor) 27. DVD-ROM drive 23 reads data from DVD-ROM (individual data storage device) 231 that has been set, for output. DVD-ROM 231 has recorded thereon, as data, a computer program 5 for the specific game and prearranged data 6 (described later). It is to be noted that, in place of DVD-ROM drive 23 and DVD-ROM 231, a freely-selected non-volatile memory can be used.

Reader-writer 24 reads data from a memory card 241 that has been set, to output the data, and also writes data in the set memory card 241. Memory card 241 has a non-volatile memory, and is where the later-described section dance data (section data) and medley dance data (medley data) will be recorded. It is to be noted that, in place of reader-writer 24 and memory card 241, a rewritable, freely-selected non-volatile memory can be used. Loaded onto RAM 25 are computer program 5 and prearranged data 6 recorded on DVD-ROM 231 and section dance data and medley dance data recorded on memory card 241. It is to be noted that a rewritable, freely-selected memory can be used in place of RAM 25.

Stored in ROM 26 are an IPL (Initial Program Loader) and an operating system. Processor 27, when a power source (not shown) is turned on, runs and executes the IPL after reading it from ROM 26, thereby executing the operating system by reading it from ROM 26, thereby loading and executing computer program 5, and thereby performing a game process, described later in detail. Processor 27, when it is executing the operating system, serves as a sound generator for outputting sound data. This sound generator is provided with first and second channels, and for each channel, can generate sound data by inputting musical sound data representing musical sounds and can create indicated effects (fading-in, fading-out, etc.).

Processor 27, when executing computer program 5, can execute a process of receiving operation data output from general operation unit 22 and dedicated operation unit 4, a process of reading data from DVD-ROM 231 (a process of causing DVD-ROM drive 23 to read data from DVD-ROM 231 and receiving the data output from DVD-ROM drive 23), a process of reading data from memory card 241 (a process of causing reader-writer 24 to read data from memory card 241 and receiving the data output from reader-writer 24), a process of reading data from RAM 25, a process of writing data into memory card 241 (a process of supplying data to reader-writer 24 and causing the data to be written in memory card 241), a process of writing data in RAM 25, a process of outputting image data and sound data to television 3, and a process of supplying data or instructions to the sound generator.

3. Prearranged Data

Figure 5:
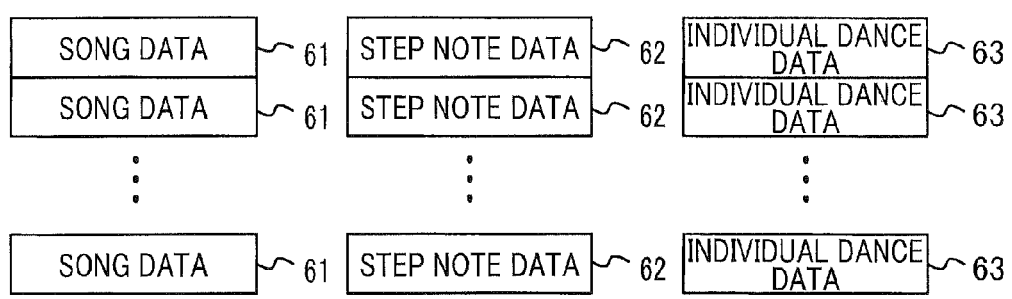
FIG. 5 is a diagram showing a configuration of prearranged data used in the game system.
Figure 6:
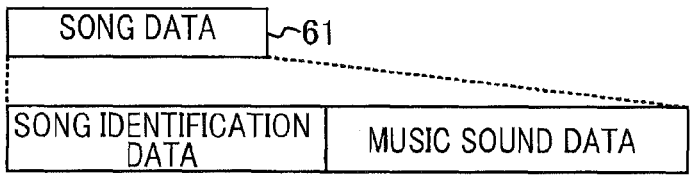
FIG. 6 is a diagram showing a configuration of song data included in the prearranged data.

FIG. 5 is a diagram showing a configuration of prearranged data 6. Prearranged data 6 is data prepared in advance as data to be used in the specific game, and includes plural pieces of song data 61, plural pieces of step note data 62, and plural pieces of individual dance data 63. Each piece of song data 61 includes, as shown in FIG. 6, song identification data for identifying a song and musical sound data indicating the musical sounds of the song in full length. The musical sound data can be data generated by sampling, or another data. Information represented by the song identification data may be a name, a number, or other type of information, but may preferably be information by which a person can easily identify the content of the song.

Figure 7:
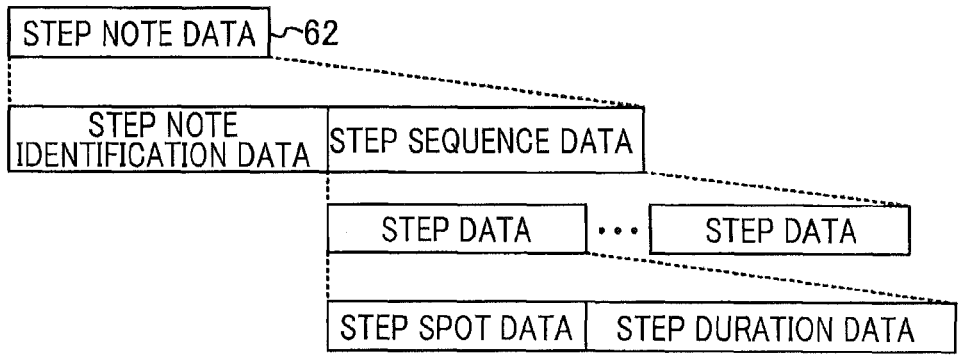
FIG. 7 is a diagram showing a configuration of step note data included in the prearranged data.

As shown in FIG. 7, a piece of step note data 62 includes step note identification data for identifying step notes and step sequence data representing a series of steps in one song; and step sequence data includes plural pieces of step data respectively corresponding to individual step of a series of steps; and each step data includes, for each step, step spot data representing a step spot and step duration data representing a duration to step on this step spot by a beat position in a 4096-note unit. The duration represented by step duration data is represented as a relative duration with respect to the beginning of a step note represented by step note data 62 including this step duration data. Information represented by step note identification data may be a name, a number, or other type of information, but may preferably be information by which a person can easily identify the content of the step notes.

Figure 8:
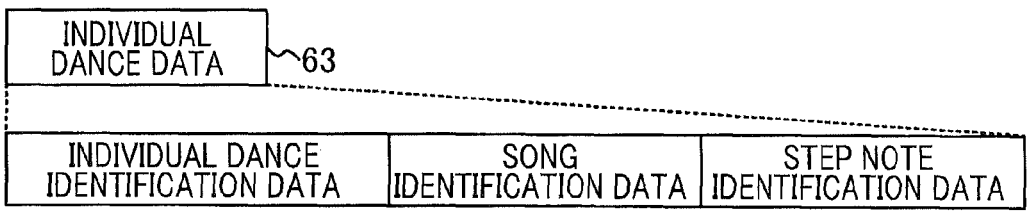
FIG. 8 is a diagram showing a configuration of individual dance data included in the prearranged data.

Individual dance data (individual data) 63 is a type of standard dance data representing a standard dance, and represents an individual dance composed by one song and one set of step notes. A piece of individual dance data 63, as shown in FIG. 8, includes individual dance identification data identifying an individual dance, song identification data, and step note identification data, and associates one song and a set of step notes. The beginning and the end of this set of step notes is the same as the beginning and the end of this song. The individual dance identification data is also standard dance identification data for identifying a standard dance.

4. Section Dance Data

Figure 9:
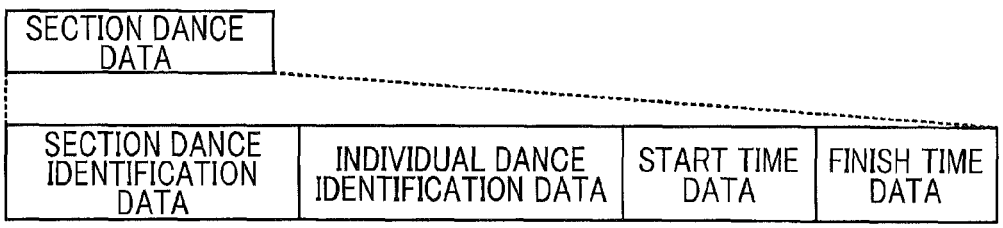
FIG. 9 is a diagram showing a configuration of section dance data used in the game system.

FIG. 9 is a diagram showing a configuration of a piece of section dance data. Section dance data (section data) is data representing a section dance. A section dance is a part of an individual dance, occupies one specified period, and includes a part of a song of this individual dance and a part of step notes. A specified period is a period of a full length song, the period being specified by a player. Section dance data representing a section dance includes section dance identification data identifying this section dance, individual dance identification data identifying an individual dance including this section dance, start time data and finish time data respectively representing the start time and the finish time of a specified period occupied by this section dance by a beat position in a sixty-fourth note unit. These times are times relative to the beginning of an individual dance including this section dance.

5. Medley Dance Data

Figure 10:
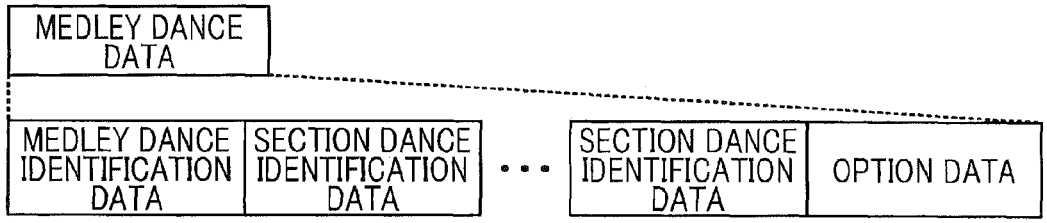
FIG. 10 is a diagram showing a configuration of medley dance data used in the game system.

FIG. 10 is a diagram showing a configuration of a piece of medley dance data. Medley dance data is a type of standard dance data representing a standard dance, and represents a medley dance in which plural section dances specified by a player are joined. A piece of medley dance data includes medley dance identification data identifying a medley dance, and plural pieces of section dance identification data respectively identifying each of plural section dances included in this medley dance and also indicating the order of these section dances, and later-described option data. Medley dance identification data is also standard dance identification data.

It is to be noted that information represented by individual dance identification data, by section dance identification data, or by medley dance identification data may be a name, a number, or other type of information, but may preferably be information by which a person can easily identify the content of the individual dance and section dance.

6. Game Process

Figure 11:
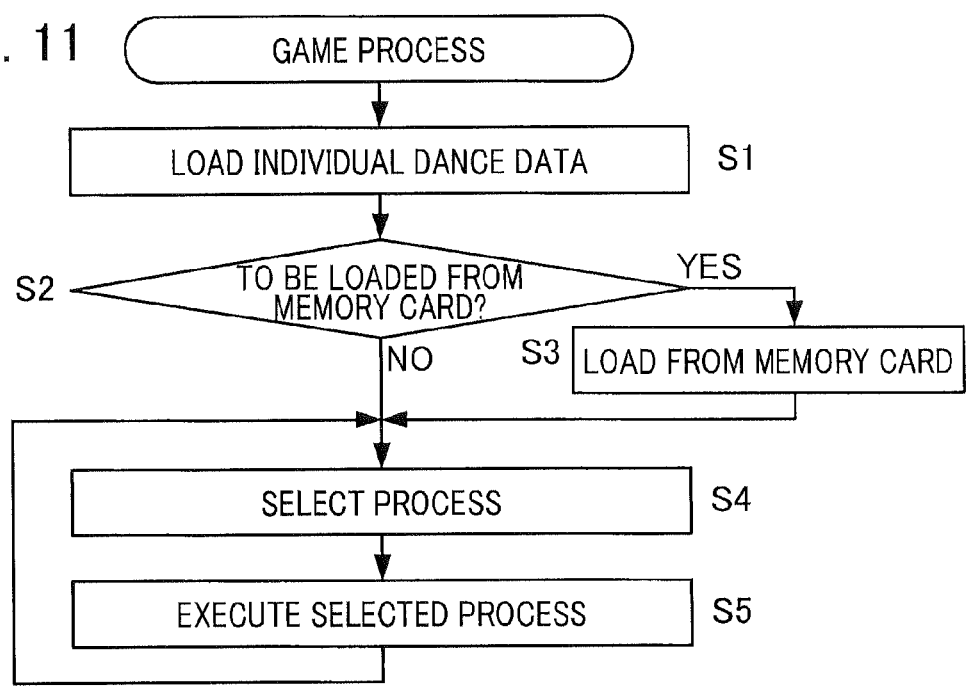
FIG. 11 is a flowchart showing a procedure of a game process in the game system.

FIG. 11 is a flowchart showing a procedure of a game process. In the game process, processor 27 initially loads all pieces of individual dance data 63 (S1). Subsequently, processor 27 determines whether the data should be loaded from memory card 241 (S2). This result of the determination changes to YES, only in a case in which memory card 241 having recorded data thereon has been set to reader-writer 24.

In a case in which a result of the determination in Step S2 is YES, processor 27 loads every piece of data from memory card 241 (S3). In a case in which this load is completed, or a result of the determination in Step S2 is NO, processor 27 prompts a player to select one of plural processes (S4). Specifically, the processor outputs to television 3 data representing an image for prompting a player to select one of the plural processes, to cause this image to be displayed on screen 31, receives operation data output from general operation unit 22, and identifies a selected process based on the operation data. Subsequently, processor 27 executes the selected process (S5). Hereinafter, the process returns to Step S3.

The plural processes selectable in Step S4 includes a section dance preparation process for prompting a player to prepare a section dance, a medley dance preparation process for prompting a player to prepare a medley dance, a record process for recording a section dance and a medley dance, and a play execution process for executing a play of the specific game.

7. Section Dance Preparation Process

Figure 12:
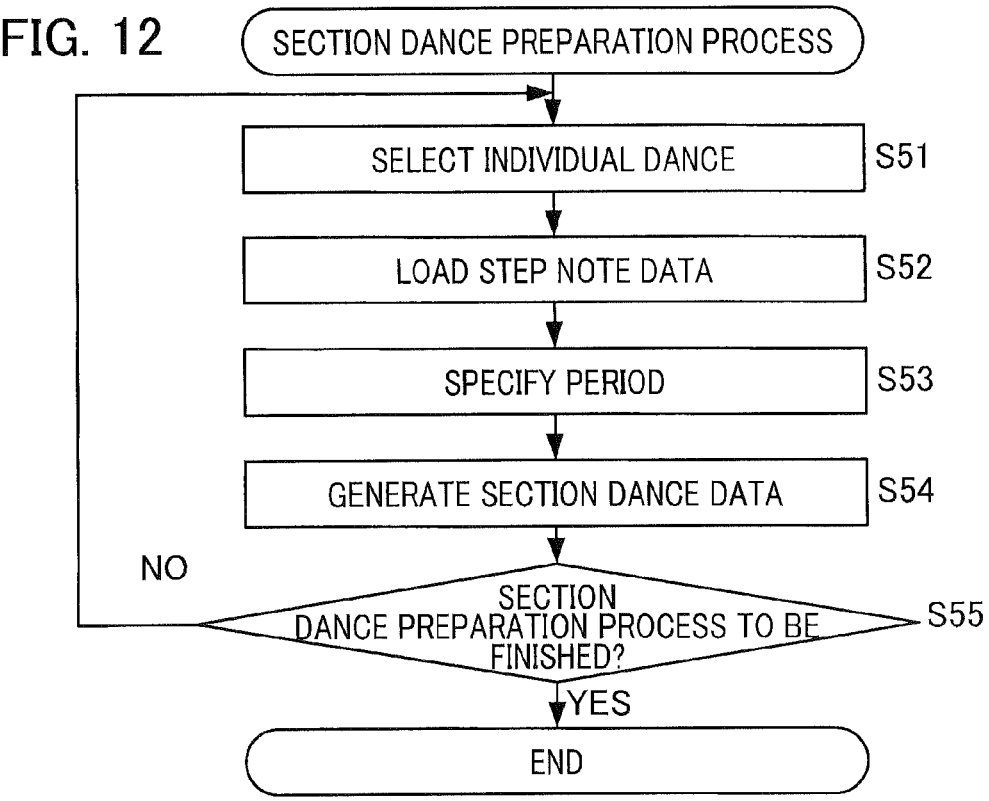
FIG. 12 is a flowchart showing a procedure of a section dance preparation process in the game system.

FIG. 12 is a flowchart showing a procedure of the section dance preparation process. In the section dance preparation process, processor 27 initially prompts a player to select, from among plural individual dances, one individual dance including a section dance which the player attempts to prepare (S51). Specifically, the processor outputs, to television 3, data representing an image for prompting a player to select one of the individual dances, to cause this image to be displayed on screen 31, receives operation data output from general operation unit 22, and identifies individual dance data 63 representing a selected individual dance based on the received operation data.

Figure 13:
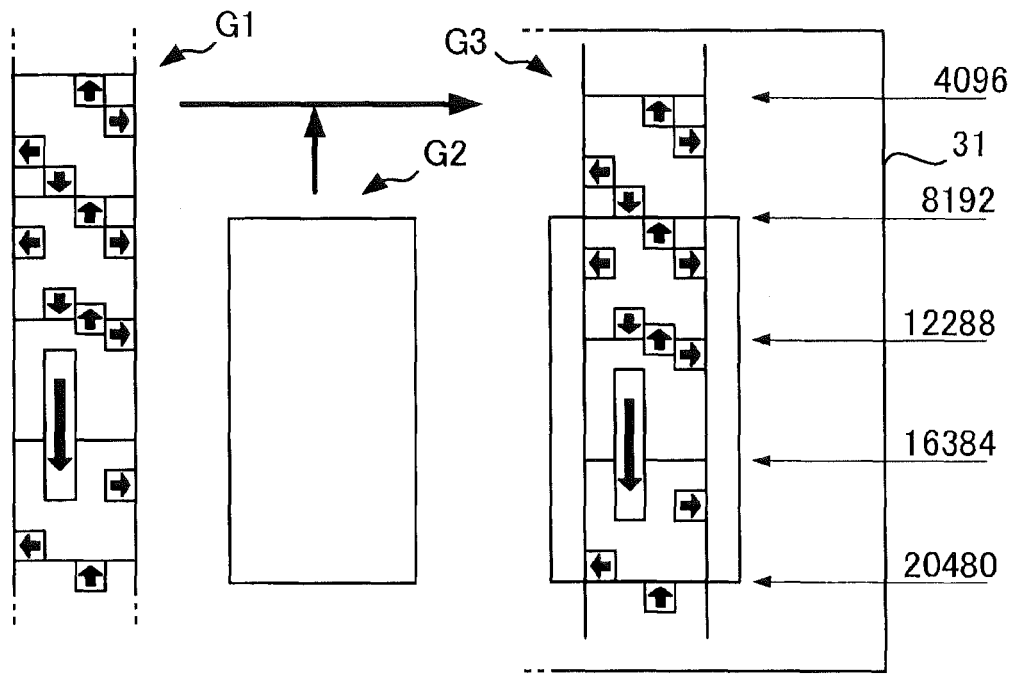
FIG. 13 is a diagram for describing an operation for preparing a section dance in the game system.

Subsequently, processor 27 loads step note data 62 for the selected individual dance (S52). Processor 27 then prompts a player to specify one specified period in this individual dance (S53). Specifically, as shown in FIG. 13, the processor generates data representing an image G1 of the step notes that make up this individual dance, and performs the following first to fourth processes until the start time and the finish time are determined for this individual dance.

The first process is a process of receiving operation data output from general operation unit 22. The second process is a process of changing two time points in the step notes making up the selected individual dance based on the received operation data. The third process is a process of generating data representing an image G2 representing a period from the earlier one of the above two time points until the later one of the above two time points, a process of generating, by using data representing image G1 and image G2, image data representing a portion G3 of a synthesized image of image G1 and image G2, the portion G3 corresponding to the received operation data, to output this image data to television 3. The fourth process is a process of determining, based on the received operation data, the earlier one (for example, 8192) of the above two time points to be the start time and the later one (for example, 20480) to be the finish time.

Subsequently, processor 27 generates section dance data representing a section dance occupying the specified period in the selected individual dance, to write it into RAM 25 (S54). This section dance data, as shown in FIG. 8, includes section dance identification data for identifying this section dance, individual dance identification data for the selected individual dance, start time data representing the determined start time, and finish time data representing the determined finish time. The information represented by the section dance identification data may be determined by processor 27 or may be input by a human.

Subsequently, processor 27 prompts the player to determine whether to end the section dance preparation process (S55). Specifically, the processor outputs, to television 3, data representing an image (for example, an image in which a button representing continuation and a button representing end are arranged) for prompting the player to select whether to end the section dance preparation process, to cause this image to be displayed on screen 31, receives operation data output from general operation unit 22, and determines whether to end the section dance preparation process based on the received operation data. In a case in which a result of the determination is NO, the process returns to Step S51; and in a case in which it is YES, the section dance preparation process ends.

8. Medley Dance Preparation Process

Figure 14:
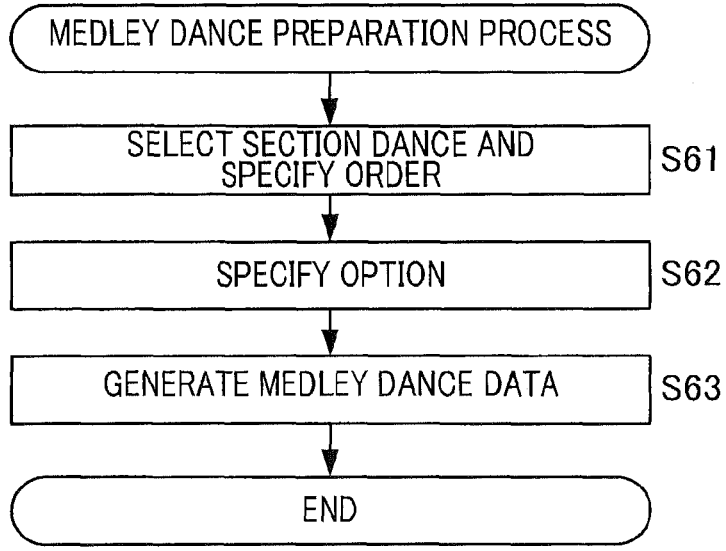
FIG. 14 is a flowchart showing a procedure of a medley dance preparation process in the game system.

FIG. 14 is a flowchart showing a procedure of the medley dance preparation process. In the medley dance preparation process, processor 27 initially prompts a player to select plural section dances from the prepared section dances, and also to specify the order of these plural section dances (S61). Specifically, the processor outputs to television 3 data representing an image for prompting a player to select plural section dances from section dances represented by pieces of section dance data stored in RAM 25, to cause this image to be displayed on screen 31, receives operation data output from general operation unit 22, and identifies plural pieces of section dance data respectively representing the selected plural section dances and the order thereof, based on the received operation data.

Subsequently, processor 27 prompts a player to specify an option for joining adjacent section dances (S62). As options that can be specified, there are a first option in which adjacent section dances are directly joined, a second option in which, without changing the content of step notes, the sounds are cross-faded when joined, and a third option in which the sounds are cross-faded when joined while changing the content of the step notes. In Step S62, processor 27, specifically, identifies an option selected from the first to third options.

Subsequently, processor 27 generates medley dance data representing a medley dance in which the selected plural section dances are joined in the specified order and by the specified option, to write the data into RAM 25 (S63). This medley dance data includes, as shown in FIG. 10, medley dance identification data for identifying this medley dance data, plural pieces of section dance identification data for the selected plural section dances, and option data representing the specified option. In this medley dance data, plural pieces of section dance identification data line up in the specified order.

9. Record Process

Figure 15:
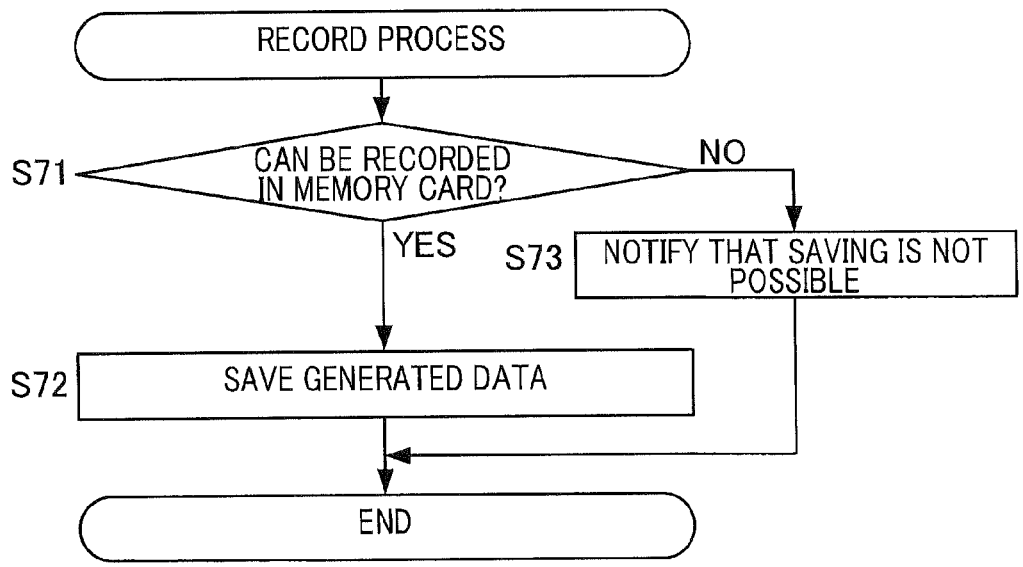
FIG. 15 is a flowchart showing a procedure of a record process in the game system.

FIG. 15 is a flowchart showing a procedure of the record process. In the record process, processor 27 first determines whether section dance data and medley dance data stored in RAM 25 can be saved in a memory card (S71). This result of the determination changes to YES only in a case in which a memory card 241 having sufficient available memory capacity has been set to reader-writer 24. In a case in which a result of the determination in Step S71 is YES, processor 27, from among pieces of data stored in RAM 25, saves pieces of the generated data (section dance data and medley dance data) by writing the generated data into memory card 241 (S72). This writing is over-writing for data already stored in memory card 241 and adding for other data.

On the other hand, in a case in which a result of the determination in Step S71 is NO, processor 27 notifies the player that the saving is not possible (S73). Specifically, the processor performs a process of outputting to television 3 data representing an image indicating that the saving is impossible, to cause this image displayed on screen 31 during a predetermined time period. The record process ends when Step S72 or S73 ends.

10. Play Execution Process

Figure 16:
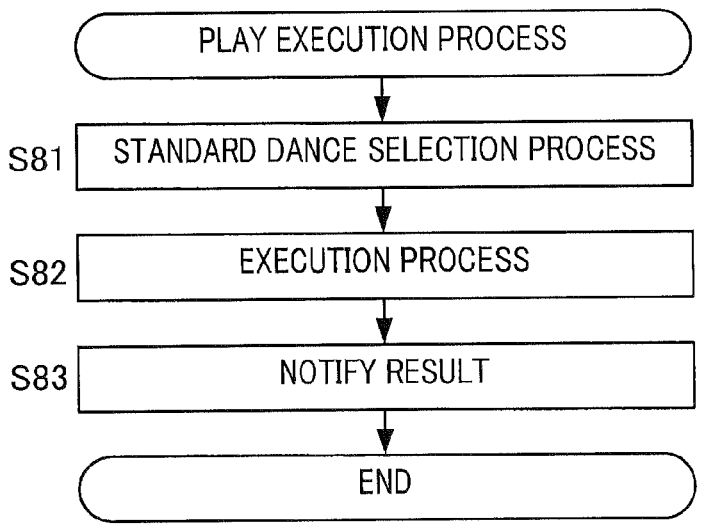
FIG. 16 is a flowchart showing a procedure of a play execution process in the game system.

FIG. 16 is a flowchart showing a procedure of the play execution process. In the play execution process, processor 27 first performs a standard dance selection process for prompting a player to select a standard dance for a play to be executed, the selection being made from among plural standard dances (S81). Specifically, processor 27 outputs to television 3 data of an image for prompting a player to select one of the plural standard dances, to cause this image to be displayed on screen 31, receives operation data output from general operation unit 22, and identifies standard dance data representing the selected standard dance based on the received operation data.

Subsequently, processor 27 performs an execution process (S82). The details of the execution process depend on the type of the selected standard dance. In a case in which the selected standard dance is an individual dance, processor 27 loads, in the execution process, musical sound data for this individual dance and step sequence data, and a play is advanced using these pieces of data. In this play, the sounds corresponding to musical sound data that has been loaded and operation data output from dedicated operation unit 4 are output from speaker 32, and an image corresponding to step sequence data that has been loaded and operation data output from dedicated operation unit 4 is displayed on screen 31.

Subsequently, processor 27 notifies a result of the play that has ended (S83). Specifically, processor 27 performs, for a predetermined time period, a process of outputting to television 3 data representing an image indicating a result of the play, to cause this image displayed on screen 31. The play execution process ends when Step S83 ends.

11. Load Process

Figure 17:
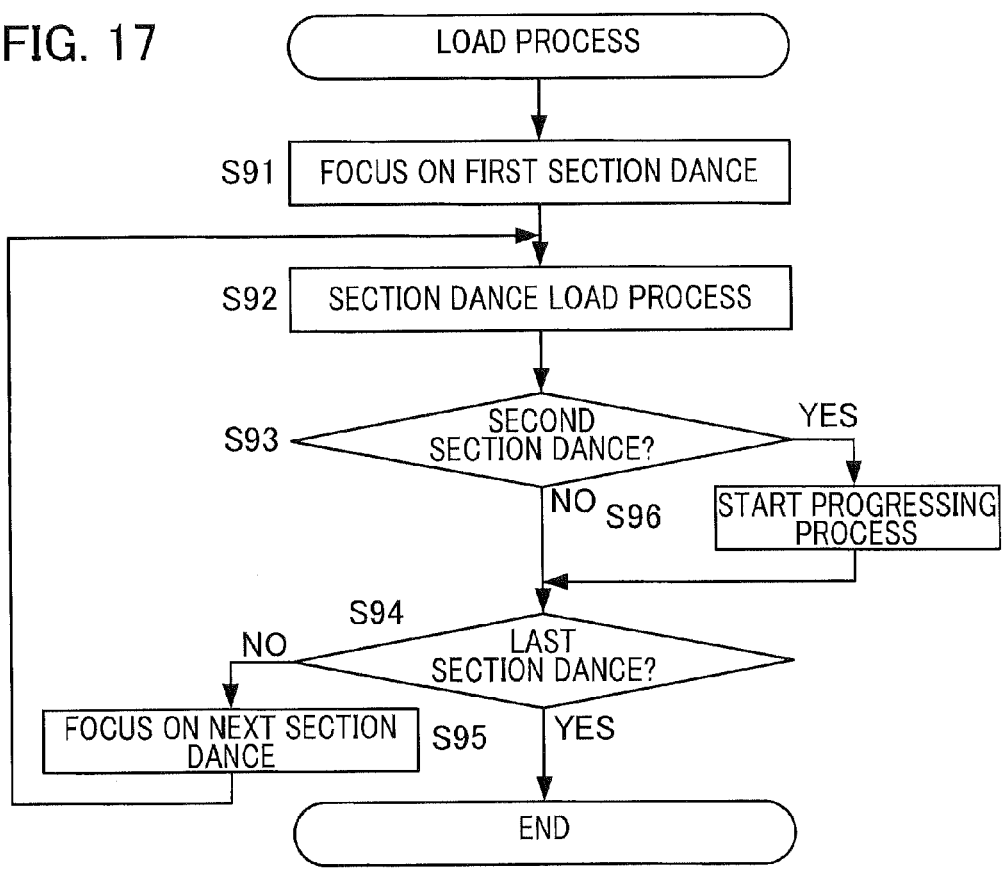
FIG. 17 is a flowchart showing a procedure of a load process in the game system.

In a case in which a standard dance selected in Step S81 is a medley dance, in the execution process of Step S82, processor 27 first starts a load process of loading sequentially the musical sound data and the step data for each section dance. As shown in FIG. 17, in the load process, processor 27 first focuses on the first section dance that makes up the selected medley dance (S91). Specifically, the processor identifies the first piece of section dance identification data from among pieces of section dance identification data included in the identified medley dance data.

Processor 27 then performs a section dance load process of loading data for the target section dance (S92). The details of the section dance load process vary depending on an option specified for the selected medley dance (option data included in the identified medley dance data). In the section dance load process, in a case in which this option is the first option, processor 27 loads, as the musical sound data for replay and the step data for replay for this section dance, data of a portion occupying a specified period delimited by the start time and the finish time for the target section dance, from among the musical sound data and the step sequence data for an individual dance including the target section dance. The section dance load process for the second and the third options will be described later.

Processor 27 then determines whether the target section dance is the second section dance (S93). In a case in which a result of this determination is NO, processor 27 determines whether the target section dance is the last section dance (S94). In a case in which a result of this determination is NO, processor 27 focuses on a subsequent section dance (S95). Hereinafter, the process returns to Step S92. On the other hand, in a case in which a result of the determination in Step S93 is YES, processor 27 starts a progressing process, described later (S96). Hereinafter, the process returns to Step S94. The load process ends when the section dance load process for the last section dance (S92) ends and when a result of the determination in Step S94 changes to YES.

Figure 18:
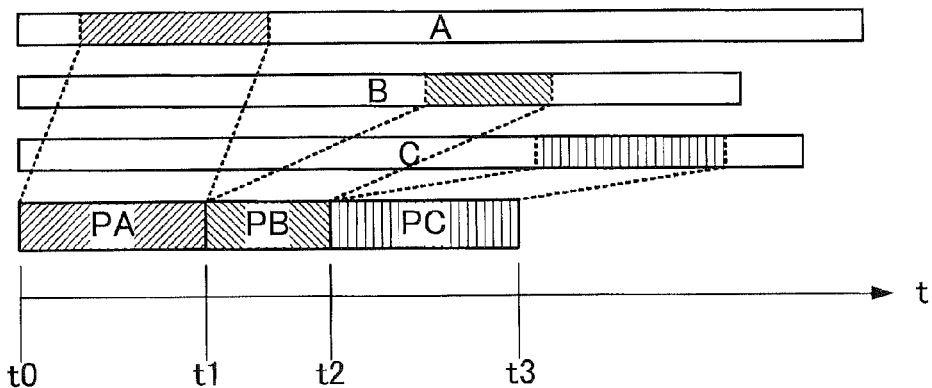
FIG. 18 is a diagram showing the execution image of the load process (for a first option).

FIG. 18 is a diagram showing an execution image of a load process of the first option. This diagram shows an individual dance (A) including PA as a section dance, an individual dance (B) including PB as a section dance, and an individual dance (C) including PC as a section dance, and a medley dance in which PA, PB, and PC are joined by the first option. This medley dance occupies a period from t0 to t3; PA a period from t0 to t1, PB a period from t1 to t2, and PC t2 to t3, where t0<t1<t2<t3.

Figure 19:
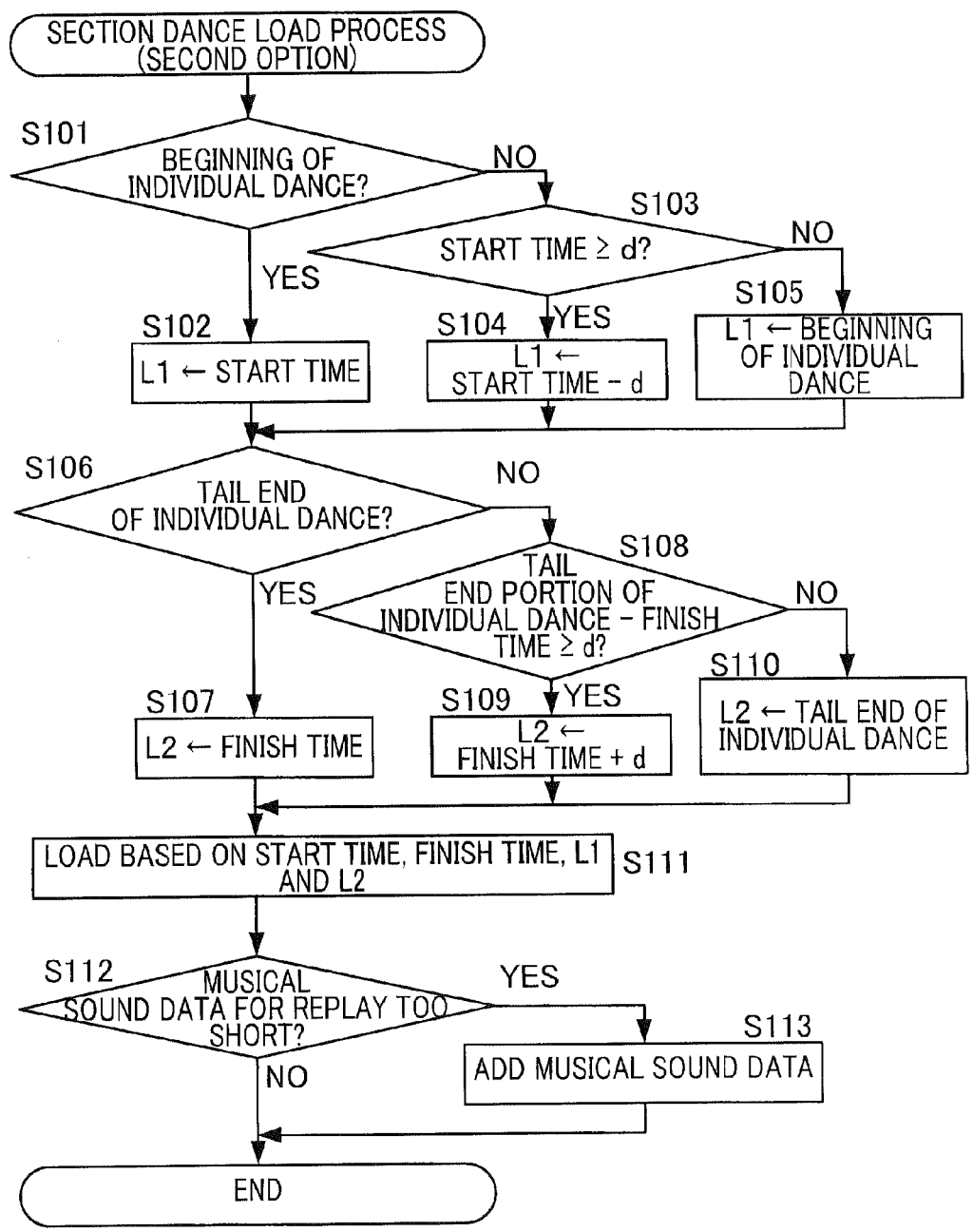
FIG. 19 is a flowchart showing a procedure of a section dance load process (for a second option) in the load process.
Figure 20:
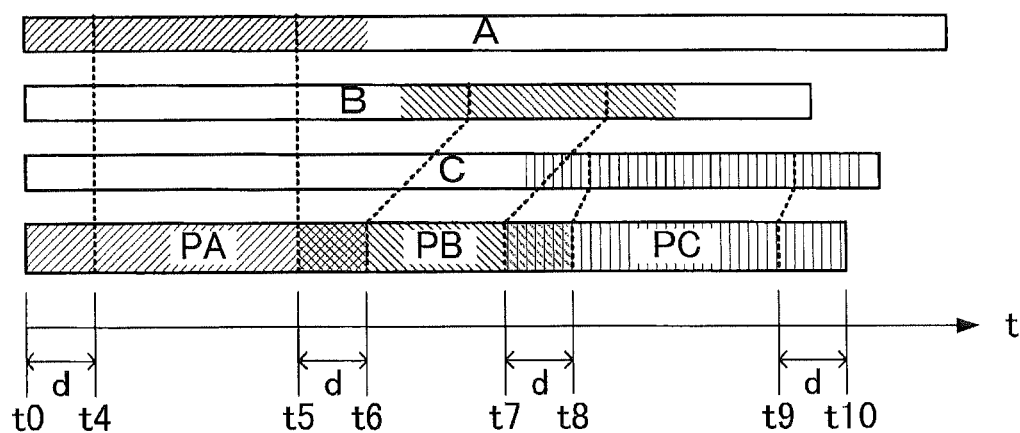
FIG. 20 is a diagram showing an execution image of the section dance load process (for second and third options).

FIG. 19 is a flowchart showing a procedure of the section dance load process in the second option, and FIG. 20 is a diagram showing an execution image of the section dance load process in the second and third options. In the second option, processor 27, in the section dance load process, first determines whether the start time of the target section dance is the beginning of an individual dance including this section dance (S101). In a case in which a result of the determination is YES, processor 27 determines this start time to be the start time (L1) of the extension period (S102). The extension period is a period including the specified period.

On the other hand, in a case in which a result of the determination in Step S101 is NO, processor 27 determines whether the start time of the target section dance (i.e., a period from the beginning of an individual dance including a section dance until the beginning of the section dance) is equal to or greater than d (S103). As shown in FIG. 20, d is the length of each of a lead-end period, a tail-end period, and a connection period (described later). In a case in which this result of the determination is YES, processor 27 determines a value corresponding to this start time minus d to be L1 (S104). On the other hand, in a case in which a result of the determination is NO, processor 27 determines the beginning time (i.e., 0) of an individual dance including this section dance to be L1 (S104). In a case in which the process of Steps S102, S104, or S105 ends, the process advances to Step S106.

In Step S106, processor 27 determines whether the finish time of the target section dance is the tail end of an individual dance including this section dance. In a case in which a result of the determination is YES, processor 27 determines this finish time to be the finish time (L2) of the extension period (S107). On the other hand, in a case in which a result of the determination in Step S106 is NO, processor 27 determines whether a result of deducting the finish time of a section dance from the tail end time of the individual dance including this section dance is equal to or greater than d (S108). In a case in which a result of the determination is YES, processor 27 determines a value of the finish time plus d to be L2 (S109). On the other hand, in a case in which a result of the determination is NO, processor 27 determines the tail end time of this individual dance to be L2 (S110). When the process in Step S107, S109, or S110 is completed, the process advances to Step S111.

In Step S111, processor 27 loads, as the step data for replay for this section dance, step data (section step data) of a portion occupying a specified period delimited by the start time and the finish time of this section dance out of step sequence data for an individual dance including the target section dance, and loads, as the musical sound data for replay for this section dance, data of a portion occupying an extension period delimited by L1 and L2 out of musical sound data for this individual dance.

Processor 27 then determines whether the loaded musical sound data for replay is too short (S112). A result of this determination changes to YES in a case in which one of the following Cases 1 to 4 is true.

Case 1: 0<the start time of target section dance minus L1<d
Case 2: 0<L2 minus the finish time of the target section dance <d
Case 3: the target section dance is a section dance (for example, PB or PC of FIG. 20) that is not the first section dance (for example, PA of FIG. 20), and the start time of the target section dance minus L1=0
Case 4: the target section dance is a section dance (for example, PA or PB of FIG. 20) that is not the last section dance (for example, PC of FIG. 20) and L2 minus the start time of the target section dance=0

In a case in which a result of the determination in Step S112 changes to YES, processor 27 adds musical sound data to the loaded musical sound data for replay (S113). Specifically, in the case of Case 1 or Case 3, processor 27 adds musical sound data indicating silence of the length corresponding to {d minus (the start time of the target section dance minus L1)} to the lead end of the loaded musical sound data for replay; in the case of Case 2 or Case 4, processor 27 adds musical sound data indicating silence of the length corresponding to {d minus (L2 minus the finish time of the target section dance)} to the tail end of the musical sound data for replay. Data after this addition will be the final musical sound data for replay for the target section dance. The section dance load process in the second option ends when Step S113 ends or a result of the determination in Step S112 changes to NO.

FIG. 20 shows a medley dance in which the above-described three section dances (PA, PB, and PC) are joined by the second or by the third option. This medley dance occupies a period from t0 to t10. PA occupies a period from t4 to t5 (specified period); PB occupies a period from t6 to t7 (specified period); and PC occupies a period from t8 to t9 (specified period), where t0<t4<t5<t6<t7<t8<t9<t10. The extension period for PA is a period from t0 to t6, the extension period for PB is a period from t5 to t8, and the extension period for PC is a period from t7 to t10.

The period from t0 to t4 is a lead end period for preventing the first section dance from starting abruptly. In this lead end period, the musical sound for A fades in. A period from t9 to t10 is a tail end period for preventing the last section dance from ending abruptly. In this tail end period, the musical sound for C fades out. A period from t5 to t6 and a period from t7 to t8 each are a connection period for connecting the immediately previous section dance and the immediately subsequent section dance. In these connection periods, the musical sound of an individual dance including the immediately previous section dance fades out, and the musical sound of an individual dance including the immediately subsequent section dance fades in.

Figure 21:
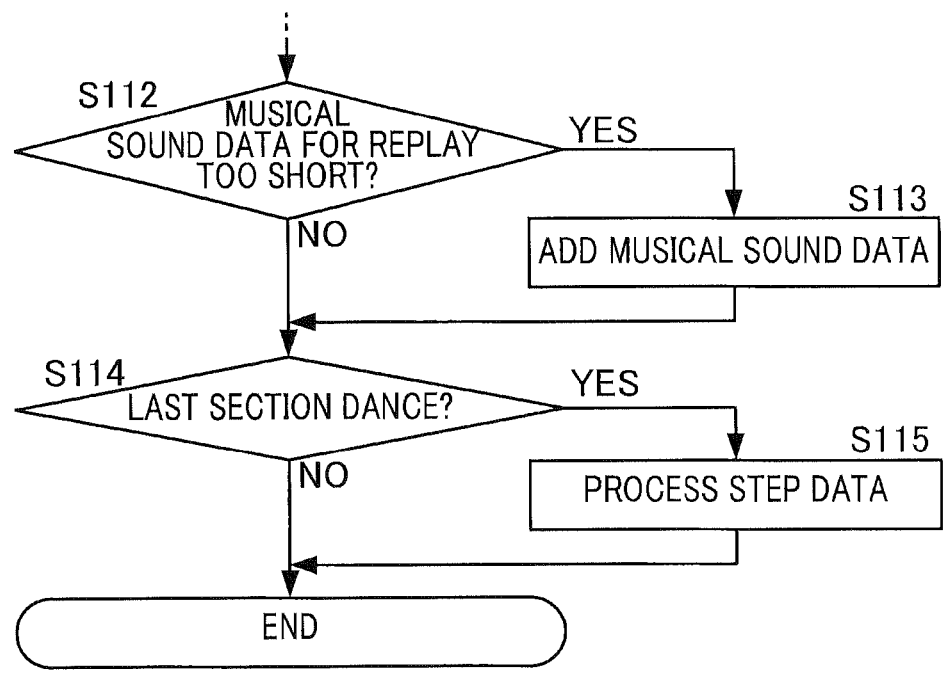
FIG. 21 is a diagram showing a part of a flowchart showing a procedure of the section dance load process (for the third option).

FIG. 21 is a diagram showing a part of a flowchart showing a procedure of the section dance load process for the third option. A portion, not shown, is the same as the section dance load process for the second option. In the section dance load process for the third option, the process advances to Step S114, when Step S113 ends, or when a result of the determination in Step S112 changes to NO.

Figure 22:
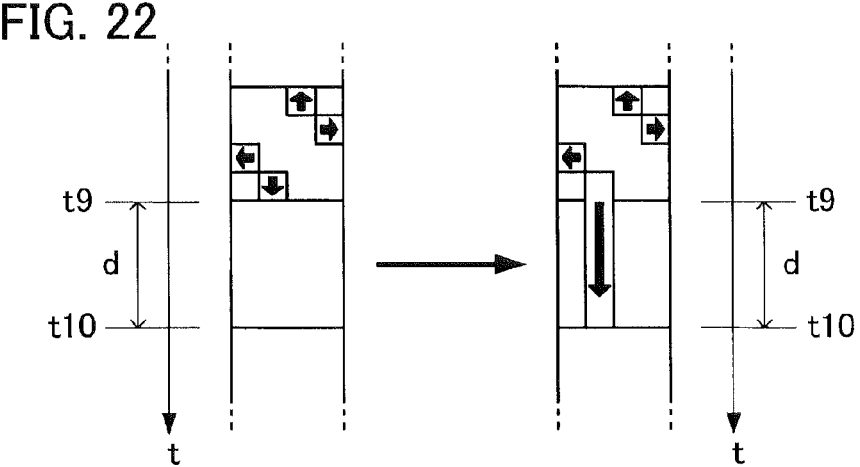
FIG. 22 is a diagram showing an execution image of processing step data in the section dance load process (for the third option).

In Step S114, processor 27 determines whether the target section dance is the last section dance from among plural section dances included in the medley dance. In a case in which a result of the determination is YES, processor 27 processes the section step data identified as step data for replay (S115). In this processing, processor 27 changes step duration data of the last step data of the loaded section step data so that the step duration data represents a period until the finish time of the section dance plus d (i.e., a period until the tail end period ends). The execution image of this processing is as shown in FIG. 22. Data after this processing will be the final step data for replay for the target section dance. The section dance load process for the third option ends when Step S115 ends or when a result of the determination in Step S114 changes to NO.

Figure 25:
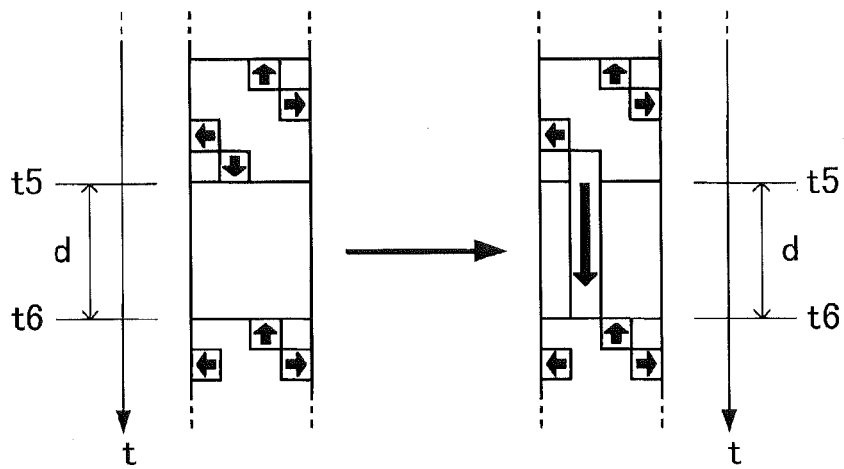
FIG. 25 is a diagram showing another execution image of processing step data in the section dance load process (for the third option).

Not only for the last section dance of a medley dance, but also for other section dances, the step duration data of the last step data may be changed so as to represent a period until the finish time of the section dance plus d. That is, not only in the tail end period, but also in a connection period connecting a first and a second consecutive section dances (the first section dance being earlier than the second section dance in time) may the step duration data of the last step data for the first section dance be processed so as to indicate the period until the end of the connection period. The execution image of this case is as shown in FIG. 25. The first section dance and the second section dance are respectively PA and PB, or PB and PC, in examples shown in FIG. 20.

12. Progressing Process

Figure 23:
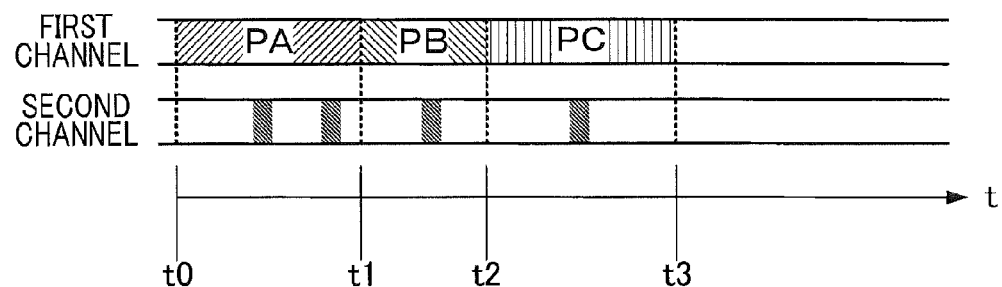
FIG. 23 is a diagram showing an image of a progressing process (for the first option).

The progressing process is a process of executing the sound output and the image display in synchronization with each other by using plural pairs of musical sound data for replay and step data for replay for the selected medley dance, and also of determining a result of a play based on operation data output from dedicated operation unit 4. The details of the progressing process could vary depending on an option specified for the selected medley dance. In the progressing process, in a case in which the above option is the first option, processor 27 uses a first channel of the sound generator for a process of generating sound data by using musical sound data for replay, and uses a second channel for generating sound data representing the effect sound including a call out such as "Nice Step" for every section dance (PA, PB, PC) as shown in FIG. 23.

Figure 24:
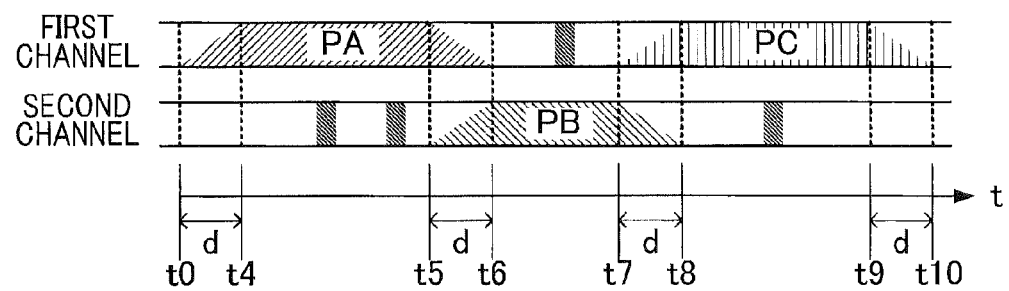
FIG. 24 is a diagram showing an image of the progressing process (for the second or third options).

On the other hand, as shown in FIG. 24, in a case in which the above option is the second or the third option, in the progressing process, processor 27 switches, between the first channel and the second channel in turn for each section dance, a channel to be used for a process of using musical sound data for replay to generate sound data, and uses a vacant channel for generating sound data representing the above effect sounds.

Moreover, in this case, processor 27 indicates to the sound generator, for each section dance, the start point (for example, t5) and the end point (for example, t6) of fading-in and the start point (for example, t5) and the end point (for example, t6) of fading-out.

13. Summary

As has been described in the foregoing, processor 27 reads from DVD-ROM 231 musical sound data and step data for plural specified periods indicated by plural pieces of section dance data indicated by medley dance data, for storage into RAM 25, and progresses a play of the specific game by using these pieces of data exclusively for each specified period in the order indicated by the medley dance data. Therefore, in game system 1, in a play of the specific game, the musical sounds of plural specified periods are joined and replayed. In game system 1, a player of the specific game operates general operation unit 22, to freely create a section dance and a medley dance. Therefore, according to game system 1, it is possible to replay any medley in which freely-selected portions of freely-selected songs are joined for plural songs, without requiring bridge music. Also, according to game system 1, the data amount can be reduced in comparison to a case in which musical sound data and step data for medley dance are additionally separately prepared.

Furthermore, processor 27 reads musical sound data for plural extension periods each including plural specified periods, thereby to read musical sound data and step data for plural specified periods. Moreover, processor 27 uses musical sound data and step data stored in RAM 25 for each specified period in the order indicated by the medley dance data in such a way that connection periods each having the length of d are interposed between specified periods, to progress a play of the specific game. Furthermore, in a connection period, processor 27 can cause the musical sound for two specified periods sandwiching this connection period to cross-fade. Also, processor 27 serves as a movement changer for changing, from among pieces of step data for replay stored in RAM 25, one that represents a period starting last in the specified period (the last step duration data of step data) so that the step duration data represents a period until the finish time of a connection period immediately after this specified period. Moreover, processor 27, in a lead period immediately before a specified period that is the first in the order indicated by the medley dance data, can cause the musical sound for an extension period including the first specified period to fade in. Furthermore, processor 27, in a tail end period immediately after a specified period that is at the tail end in the order indicated by the medley dance data, can cause the musical sound for an extension period including the last specified period to fade out. Therefore, according to game system 1, an impression of oddness given to a player can be reduced.

Furthermore, processor 27 serves as a sound generator for two channels, and can switch a channel to replay musical sound using musical sound data between these channels in turn for each extension period. Therefore, according to game system 1, the cross-fading can be performed in a connection period.

In game system 1, musical sound data, the size of which is larger than step data, is read from DVD-ROM 231, which is slower in its access speed compared to RAM 25. However, processor 27 sequentially reads, from RAM 25, musical sound data for plural specified periods for each specified period or extension period, and starts the progressing process after musical sound data for a predetermined number of specified periods are stored in RAM 25. Therefore, there will be less possibility of a play being cut off due to the reading speed of musical sound data becoming a bottleneck.

14. Modification

The above embodiment may be modified so that a section dance can be edited based on Japanese Patent Publication No. 3261110. In this case, data showing the details of the edit is stored in RAM 25. It may be configured so that this data can be recorded on memory card 241.

The above embodiment may be modified so that a unit that can be specified for the start time and the finish time of a section dance is a bar (four quarter notes) unit. In this case, even if the first option is specified, the discontinuity in a melody will be relatively natural.

The above embodiment may be modified in a manner in which movement data for connection periods indicating the movement to be instructed by an image during connection periods is stored in RAM 25, which is a temporary storage device, and in which movement data for connection periods is used in connection periods in the progressing process.

In the above embodiment, the last step data (movement data) in a specified period concurrently serves as movement data for connection periods, by the step duration data of the last step data being changed by the movement changer. In another embodiment of movement data for a specified period concurrently serving as movement data for connection periods, for example, from among pieces of step data for replay loaded in the above load process, pieces of step data including plural steps (plural steps is not an integer in a case in which duration d is not the multiple of a period corresponding to one step) corresponding to a duration d from the start of the subsequent music may be used as movement data for connection periods. In this case, during a connection period, the movement data of the next music may be read as movement data for connection periods, and the step notes of the beginning portion of the next music may be statically displayed.

Figure 26:
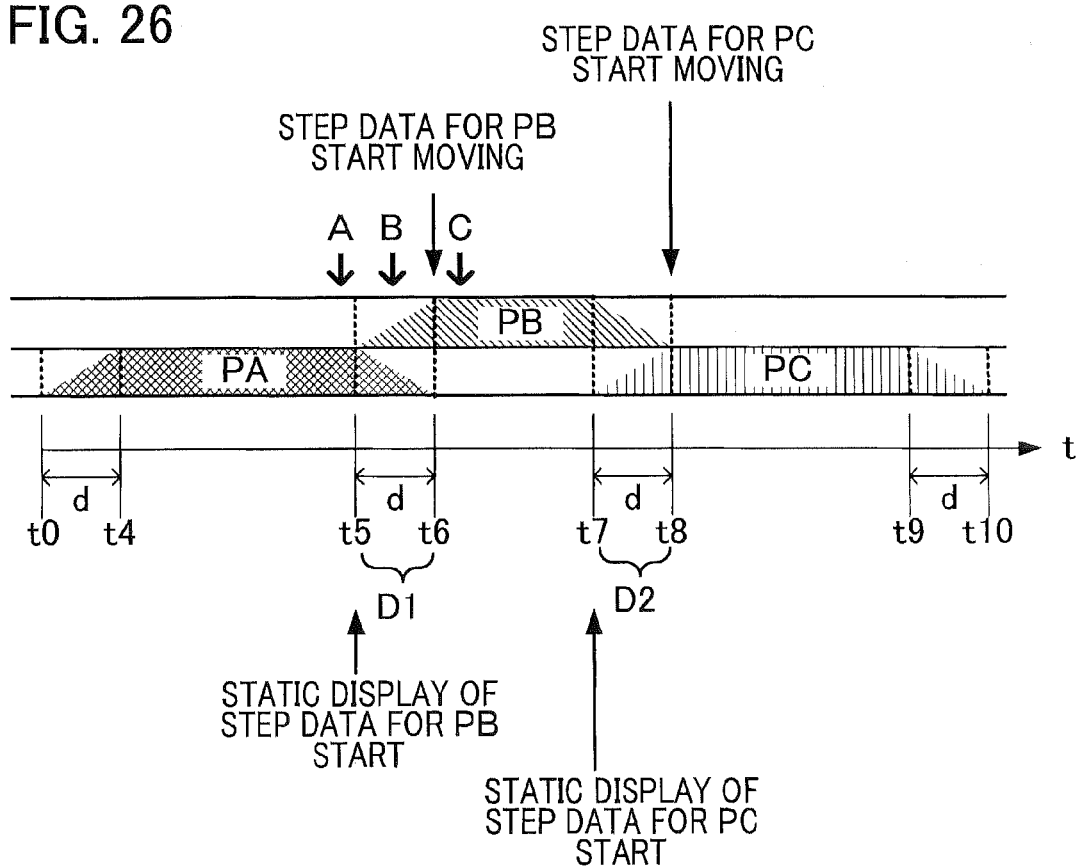
FIG. 26 relates to a modification of the present invention and is a time chart showing display timings of step data in the connection period.
Figure 27:
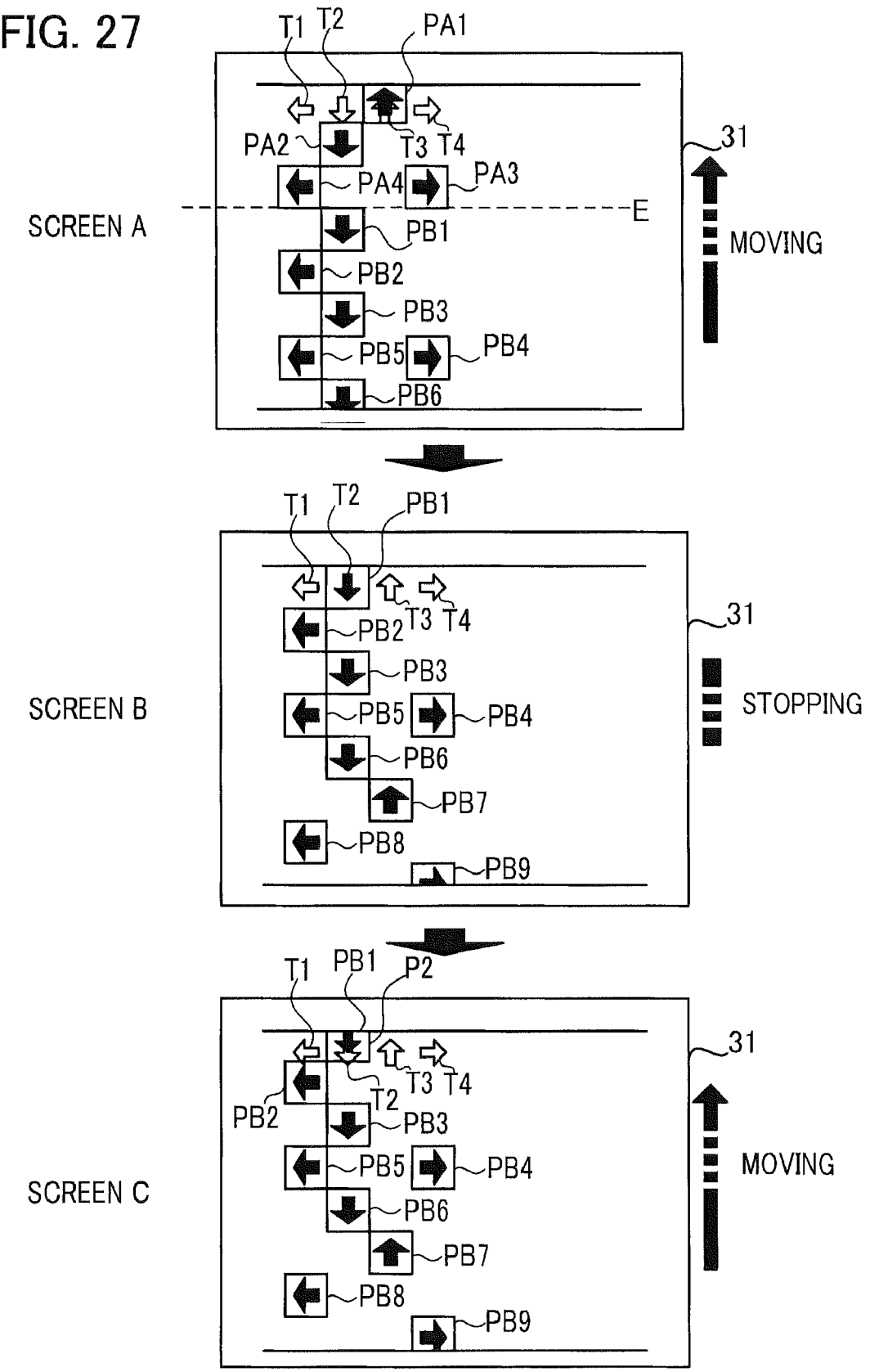
FIG. 27 relates to the modification, and is a diagram showing an example of an image displayed on a screen in the connection period.

Detailed description will be given of this modification with reference to FIGS. 26 and 27. As shown in FIG. 26, in this example, three songs, PA, PB, and PC, are replayed in order, and, in a connection period D1 (t5 to t6) in which it transits from PA to PB, PA fades out and PB fades in. In a connection period D2 (t7 to t8) in which it transits from PB to PC, PB fades out and PC fades in. As shown in FIGS. 26 and 27 at a time point (time point <t5) immediately previous to a time point t5, for example, screen A moving (scrolling) upwards of screen 31 is displayed. In screen A, the dashed line E is a boundary between a step spot indication mark group for PA and a step spot indication mark group for PB. Images that are displayed and flow above the dashed line E indicate steps for PA, and images that are displayed and flow below the dashed line E indicate steps for PB.

When the time then reaches t5, the scrolling of screen 31 stops, and step spot indication marks are statically displayed (screen B). In this example, it is when the time reaches t5 that the first step spot indication mark PB1 for PB overlaps the step duration indication mark T2. This static condition continues when the time reaches t6. When the time t6 is reached, a screen again starts moving, and will be a state that is shown in screen C. In short, when the time is equal to or greater than t5 and less than t6, screen B is statically displayed; when the time reaches T6, the screen starts moving and transits to screen C. Similarly, in a connection period D2, when the first step spot indication mark of PC overlaps either one of step duration indication marks T1 to T4 (i.e., it reaches the time t7), the screen enters a static state, and when it reaches the time t8, the screen again starts to flow.

According to this embodiment, even in a case in which the speed of the song or steps is different between the earlier song and the later song before and after the connection period, the player is able to wait in a static condition, being unaffected by the speed of either song, and the player can prepare for smoothly entering the steps for the following song. For example, during a connection period, step spot indication marks of the following song are displayed on the screen without moving, a player, looking at the step spot indication marks in the connection period, can check the steps of the following song in advance. In this case, it may be determined that points are added if a player is stepping on a step spot indication mark overlapping a step duration indication mark when the screen comes to a halt, and that it is a misplay (=no points added) if a player is not, or it may be configured so that no points are added in connection periods at all.

In a connection period, in a case in which an image for instructing a standard dance is displayed as an image indicated by the movement data for connection periods, either step data for an extension period including a specified period immediately previous to the connection period or step data for an extension period including a specified period immediately after the connection period may be used as the movement data for connection periods, or step data may be newly generated based on both so that this newly generated step data is used as the movement data for connection periods. Furthermore, not only in the connection period but also in at least one of the lead end period and the tail end period, the movement data for connection periods may be used to display an image for instructing a standard dance, and on or off of this display may be specified for each medley data.

Also, the above embodiments may be modified in such a way that, as a step pattern for a connection period, one of the predetermined plural step patterns may be selected, and step pattern data showing the selected step pattern may be loaded in RAM 25 as the movement data for connection periods. Furthermore, in this case, it may be configured so that the speed of the selected step pattern (BPM (beats per minute)) is changed (increased or reduced) at a constant ratio from the speed of a song (first song) for a specified period immediately previous to a connection period to the speed of a song (second song) for a specified period immediately after the connection period. According this embodiment, a player, for example, in a case in which the previous song is slow and the next song is fast, the player would dance steps (interlude steps) that were gradually progressively faster, and therefore, the player can make a smooth transition to the steps for the next song.

It is to be noted that, as predetermined step patterns, there are, for example, a step pattern in which a step spot indication mark for a left step spot L, a step spot indication mark for a right step spot R, a step spot indication mark for a left step spot L, and a step spot indication mark for a right step spot R appear cyclically in a period unit corresponding to the quarter notes, and a step pattern in which a step spot indication mark corresponding to a front step spot F, a step spot indication mark corresponding to a left step spot L, a step spot indication mark corresponding to a back step spot B, and a step spot indication mark corresponding to a right step spot R appear cyclically in a period unit corresponding to the quarter notes.

Figure 28:
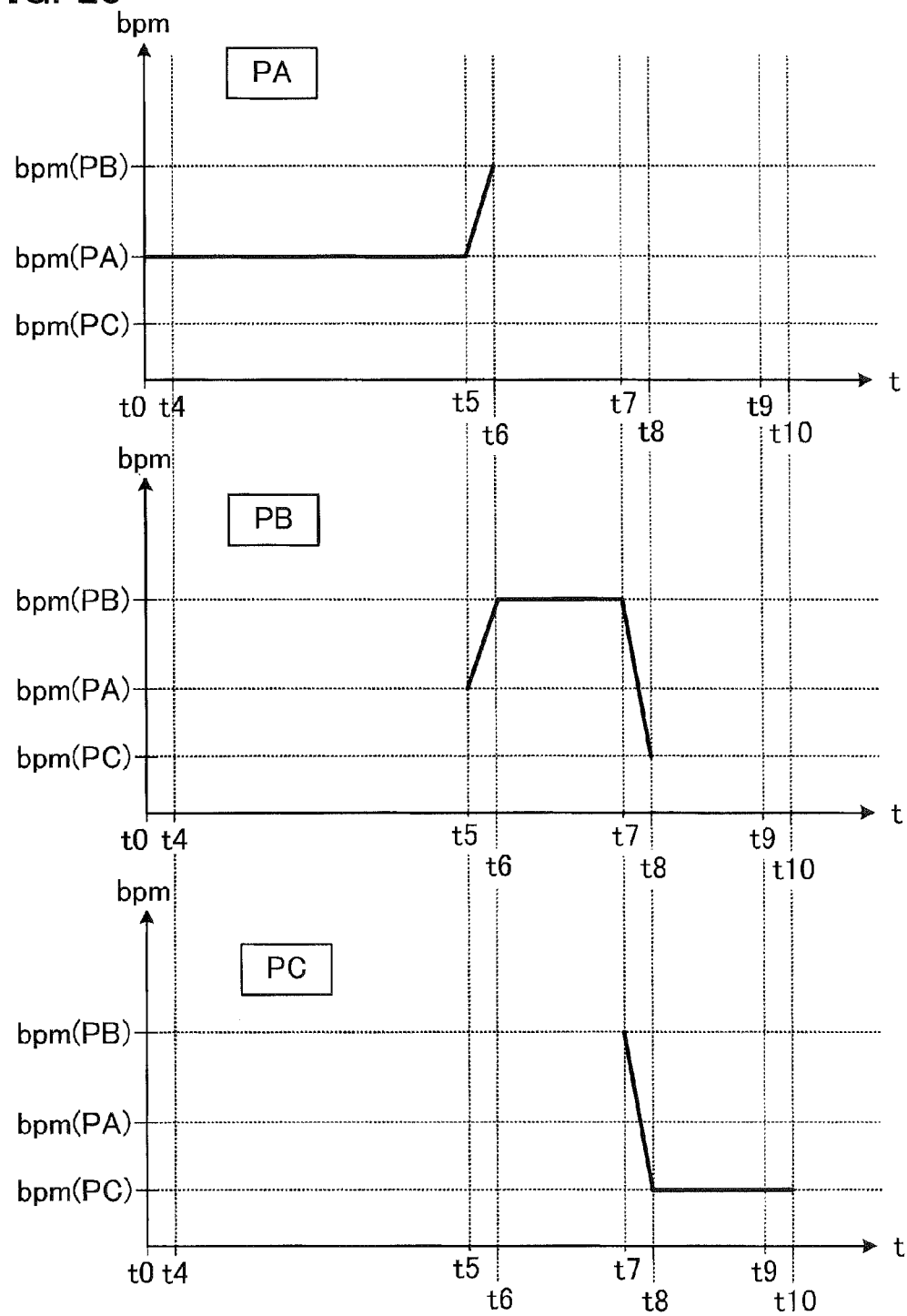
FIG. 28 relates to a modification of the present invention, and is a diagram showing how the speed of replaying music is changed.

Furthermore, in addition to (or as an alternative to) changing the speed of the step pattern of a connection period from that of the first song to that of the second song, the speed of the song may be changed (increased or reduced) from that of the first song to that of the second song. That is, the speed of the song played in a connection period may be changed from that of the first song to that of the second song in such a way that, at first in the connection period, both the first song and the second song are replayed at the speed of the first song, that, thereafter, the speed of both songs increase or decrease at the same rate, and that both songs will be at the speed of the second song at a point at which a connection period ends. FIG. 28 shows how the speed changes in this case.

Specifically, in FIG. 28, in a connection period (t5 to t6) between the first song (PA in this case) and the second song (PB in this case), the speed of each song PA, PB changes gradually. PA is replayed at bpm(PA) until it reaches time t5; when it reaches time t5, the speed starts to increase; and when the time reaches t6 and the song fades out, the speed thereof will be bpm(PB). PB, when it fades in at time t5, is replayed at bpm(PA), but the speed thereof gradually increases, and when the time reaches t6, the speed thereof will be bpm(PB). Similarly, PB and PC respectively are a first song and a second song, and in the connection period (t7 to t8) between both songs, the speed of each song PB, PC gradually changes. PB, until the time reaches t7, is replayed at bpm(PB), and the speed starts decreasing when the time reaches t7. When the time reaches t8 and the song fades out, the speed thereof will be down to bpm(PC). PC, when it fades in at time t7, is replayed at bpm(PB), but the speed of the song gradually decreases, and when the time reaches t8, the speed thereof will be bpm(PC). It is to be noted that in an example shown in the figure, bpm(PA), bpm(PB), and bpm(PC) respectively show the speed at which each PA, PB, and PC is replayed, satisfying bpm(PB)>bpm(PA)>bpm(PC).

According to this embodiment, the transition to the second song will be smoother, and the steps of the second song will be easier to dance. Furthermore, in a case in which the speed of the step pattern is changed from that of the first song to that of the second song in addition to the change in the speed of a song, both the speed of the steps and that of the song are changed smoothly, the steps of the second song will be easier to dance.

Furthermore, the above embodiment may be modified so as to be applied to a freely-selected music game in a play of which the musical sounds are replayed and images for instructing movements are displayed, and in which a result of the play is determined based on the degree of agreement of the player's movements with the instructed movements.

The above embodiment may be modified so as to be applied to a game terminal other than a home-use game machine. An arcade game machine can be given as an example of such a game terminal. In the case of the arcade game machine, for example, a hard disk corresponds to DVD-ROM 231; and a recording medium carried by a player corresponds to memory card 241. Furthermore, in the above embodiment, data recorded in memory card 241 may be stored in a server device capable of communicating with an arcade game machine via a network.

The invention claimed is:

1. A game system for a music game in which, in a play of the game, musical sounds are replayed, in which an image for instructing a movement is displayed, and in which a result of the play is determined based on the degree of agreement of a movement of a player with the movement instructed by the image, the game system comprising:
    an operator that is operated by the player;
    an individual data storage having stored thereon, for each of plural songs, musical sound data indicating musical sounds of each song in a full length and pieces of movement data indicating the movements to be instructed by the image for the song in a full-length;
    a section data storage that stores, for each of at least two of the plural songs, section data indicating a specified period of the full-length song, a start time and a finish time of the specified period having been specified by using the operator;
    a medley data storage that stores medley data indicating, from among plural pieces of the section data stored in the section data storage, at least two pieces of section data specified by using the operator and also indicating the order of the at least two pieces of section data, with the order having been specified by using the operator;
    a temporary storage that temporarily stores the musical sound data and the movement data;
    a loader that performs a load process of reading, from the individual data storage, the musical sound data and pieces of the movement data corresponding to each of at least two specified periods indicated by the at least two pieces of section data indicated by the medley data, for storage in the temporary storage; and
    a progressor that performs a progressing process for progressing the play by exclusively using the musical sound data and the pieces of movement data stored in the temporary storage for each specified period and in the order indicated by the medley data, thereby connecting the musical sounds of the at least two specified periods, for replay,
    wherein the loader performs the load process of loading the musical sound data by reading the musical sound data of at least two extension periods for each of the at least two specified periods, with each extension period including the specified period; and wherein the progressor performs the progressing process by progressing the play by using the musical sound data and the pieces of movement data stored in the temporary storage for each specified period, in the order indicated by the medley data and in such a way that a connection period of a certain length is provided between the specified periods, and the progressor performs, in the connection period, an extension process of causing the musical sounds of the extension period including an earlier one of the two specified periods sandwiching the connection period to fade out and the musical sounds of the extension period including a later one of the specified periods to fade in.

2. A game system according to claim 1,
wherein the temporary storage stores a piece of movement data for the connection period indicating a movement instructed by the image during the connection period; and
wherein the progressor uses the movement data for the connection period in the connection period.

3. A game system according to claim 2,
wherein the movement data corresponding to the specified period also serves as the movement data for the connection period,
the game system further comprising:
a movement changer that changes, from among pieces of movement data stored in the temporary storage, a piece of movement data that is included in the earlier specified period and that represents a last duration of the specified period so that the piece of movement data represents a duration that ends at the finish time of the connection period.

4. A game system according to claim 2,
wherein the loader performs the load process of loading the movement data by reading pieces of the movement data of at least two extension periods each including the respective at least two specified periods, and
wherein the progressor generates the movement data for the connection period based on, from among the pieces of the movement data for two extension periods, a piece of the movement data with respect to the connection period, each of the two extension periods including respective two specified periods sandwiching the connection period, and the progressor uses the movement data for the connection period in the connection period.

5. A game system according to claim 1,
wherein the progressor, in the extension process, further causes the musical sounds of an extension period including a first specified period that is the first in the order to fade in, in a lead end period that is immediately before the first specified period.

6. A game system according to claim 1,
wherein the progressor, in the extension process, further causes the musical sounds of an extension period including a last specified period that is the last in the order to fade out, in a tail end period that is immediately after the last specified period.

7. A game system according to claim 1,
further comprising plural channels for a sound generator,
wherein the progressor uses two channels of the plural channels and switches, for each extension period, a channel for replaying the musical sounds based on the musical sound data between the two channels.

8. A game system according to claim 1,
wherein the loader performs the load process by reading, from the individual data storage, sequentially for each specified period, pieces of the musical sound data of the at least two specified periods, and
wherein the progressor starts the progressing process after the pieces of the musical sound data for a predetermined number of specified periods are stored in the temporary storage.

9. A game system according to claim 3,
wherein the loader performs the load process of loading the movement data by reading pieces of the movement data of at least two extension periods each including the respective at least two specified periods, and
wherein the progressor generates the movement data for the connection period based on, from among the pieces of the movement data for two extension periods, a piece of the movement data with respect to the connection period, each of the two extension periods including respective two specified periods sandwiching the connection period, and the progressor uses the movement data for the connection period in the connection period.

10. A game system according to claim 2,
wherein the progressor, in the extension process, further causes the musical sounds of an extension period including a first specified period that is the first in the order to fade in, in a lead end period that is immediately before the first specified period.

11. A game system according to claim 2,
wherein the progressor, in the extension process, further causes the musical sounds of an extension period including a last specified period that is the last in the order to fade out, in a tail end period that is immediately after the last specified period.

12. A game system according to claim 2,
further comprising plural channels for a sound generator,
wherein the progressor uses two channels of the plural channels and switches, for each extension period, a channel for replaying the musical sounds based on the musical sound data between the two channels.

13. A game system according to claim 2,
wherein the loader performs the load process by reading, from the individual data storage, sequentially for each specified period, pieces of the musical sound data of the at least two specified periods, and
wherein the progressor starts the progressing process after the pieces of the musical sound data for a predetermined number of specified periods are stored in the temporary storage.

14. A non-transitory computer-readable storage medium storing a computer program to be executed by a processor the computer program causing the processor to execute,
wherein the processor is used in a game system of a music game in which, in a play of the music game, musical sounds are replayed, in which an image for instructing a movement is displayed, and in which a result of the play is determined based on the degree of agreement of a movement of a player with the movement instructed by the image, the game system having an operator that is operated by the player; an individual data storage having stored thereon, for each of plural songs, musical sound data indicating musical sounds of each song in full length and pieces of movement data each indicating the movements to be instructed by the image for the full-length song; a section data storage that stores, for each of at least two of the plural songs, section data indicating a specified period of the full-length song, a start time and a finish time of the specified period having been specified by using the operator; a medley data storage that stores medley data indicating, from among plural pieces of the section data stored in the section data storage, the at least two pieces of section data specified by using the operator and also indicating the order of the at least two pieces of section data, with the order having been specified by using the operator; and a temporary storage that temporarily stores the musical sound data and the movement data, a load process of reading, from the individual data storage, the musical sound data and pieces of movement data corresponding to each of at least two specified periods indicated by the at least two pieces of section data indicated by the medley data, for storage in the temporary storage, wherein the at least two specified periods are specified by using the operator; and a progressing process of progressing the play by exclusively using the musical sound data and the pieces of movement data stored in the temporary storage for each specified period and in the order indicated by the medley data, thereby connecting the musical sounds of the at least two specified periods for replay, wherein, in the load process, the processor causes the musical sound data to load, by reading the musical sound data of at least two extension periods for each of the at least two specified periods, with each extension period including the specified period; and wherein in the progressing process, the processor causes the play to progress by using the musical sound data and the pieces of movement data stored in the temporary storage for each specified period, in the order indicated by the medley data and in such a way that a connection period of a certain length is provided between the specified periods, and, in the connection period, the processor causes the musical sounds to fade out, of the extension period including an earlier one of the two specified periods sandwiching the connection period, and causes the musical sounds to fade in, of the extension period including a later one of the specified periods.

* * * * *